US011380283B2

(12) United States Patent
Shim et al.

(10) Patent No.: US 11,380,283 B2
(45) Date of Patent: Jul. 5, 2022

(54) ELECTRONIC APPARATUS FOR CONTROLLING SIZE OF DISPLAY AND METHOD FOR CONTROLLING THE SAME

(71) Applicant: LG ELECTRONICS INC., Seoul (KR)

(72) Inventors: Hongjo Shim, Seoul (KR); Seounghwan Seol, Seoul (KR); Youngmo Kim, Seoul (KR); Sungwook Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 16/738,801

(22) Filed: Jan. 9, 2020

(65) Prior Publication Data
US 2021/0166651 A1 Jun. 3, 2021

(30) Foreign Application Priority Data

Nov. 29, 2019 (WO) ................ PCT/KR2019/016748

(51) Int. Cl.
*G09G 5/00* (2006.01)
(52) U.S. Cl.
CPC ......... *G09G 5/003* (2013.01); *G09G 2354/00* (2013.01); *G09G 2380/02* (2013.01)
(58) Field of Classification Search
CPC ........ G06F 2203/04105; G06F 3/0414; G09G 2380/02; H05K 1/028
See application file for complete search history.

(56) References Cited

U.S. PATENT DOCUMENTS 9,681,538 B2 6/2017 Ahn
2012/0212433 A1* 8/2012 Lee .................. G06F 3/041
345/173
2013/0252668 A1* 9/2013 Cheng ................ G06F 1/1647
455/556.1
(Continued)

FOREIGN PATENT DOCUMENTS

JP 2015153391 8/2015
KR 1020160000658 1/2016
KR 1020160127542 11/2016

OTHER PUBLICATIONS

PCT International Application No. PCT/KR2019/016748, International Search Report dated Aug. 24, 2020, 4 pages.
(Continued)

*Primary Examiner* — Kent W Chang
*Assistant Examiner* — Chayce R Bibbee
(74) *Attorney, Agent, or Firm* — Lee Hong Degerman Kang & Waimey

(57) ABSTRACT

Provided is an electronic apparatus including a flexible display having at least a portion thereof positioned at a first surface of the electronic apparatus and changing in size to be exposed according to driving of a motor, a first sensor configured to sense a pressure applied to at least one of the first surface and a second surface opposing the first surface, and a controller configured to sense a first input to at least one of the first surface and the second surface, and, when a pressure corresponding to the first input satisfies a predetermined condition, control, based on the first input, a size of the display to be exposed at the first surface.

17 Claims, 22 Drawing Sheets

(56) References Cited

U.S. PATENT DOCUMENTS

| | | | | |
|---|---|---|---|---|
| 2014/0098028 A1* | 4/2014 | Kwak | ................... | G06F 3/0484 |
| | | | | 345/173 |
| 2015/0153777 A1 | 6/2015 | Liu et al. | | |
| 2016/0179288 A1 | 6/2016 | Iida et al. | | |
| 2017/0011714 A1* | 1/2017 | Eim | ...................... | G06F 1/1677 |
| 2017/0212556 A1 | 7/2017 | Jovanovic | | |
| 2019/0155492 A1* | 5/2019 | Woo | ...................... | G09G 5/373 |
| 2019/0163892 A1* | 5/2019 | Lin | ...................... | G06F 1/1652 |
| 2019/0268455 A1 | 8/2019 | Baek et al. | | |

OTHER PUBLICATIONS

European Patent Office Application Serial No. 20152527.6, Search Report dated Aug. 27, 2020, 15 pages.

\* cited by examiner

First direction

ELECTRONIC APPARATUS FOR CONTROLLING SIZE OF DISPLAY AND METHOD FOR CONTROLLING THE SAME

CROSS-REFERENCE TO RELATED APPLICATION

Pursuant to 35 U.S.C. § 119 (a), this application claims the benefit of earlier filing date and right of priority to International Application No. PCT/KR2019/016748, filed on Nov. 29, 2019, the contents of which are all hereby incorporated by reference herein in its entirety.

BACKGROUND

1. Field

The present disclosure relates to an electronic apparatus for controlling a size of a display based on an input sensed using a sensor and a method for controlling the same.

2. Description of the Related Art

As network technologies has developed and infrastructure has expanded, it is possible to perform various and professional tasks in an electronic apparatus. Accordingly, there are increasing demands for an electronic apparatus including a display capable of displaying a content through a large screen.

If a display has a large screen, the size of the display increases in proportion to the size of the screen. Thus, as for an electronic apparatus of which mobility is emphasized, the mobility of the electronic apparatus should be considered as well as the size of the display.

Accordingly, applying a flexible display to an electronic apparatus and changing a size of a display only when necessary may be considered.

As such, in the case of a display capable of changing in size to be exposed, damage may be caused to the electronic device according to how a user operates. For example, when the user weakly holds the display while the display is being extended, the user may drop the electronic device due to the movement of the electronic device.

In another example, when the user's hand is positioned in a direction in which the display is extended, a pressure may be applied to a motor operating in association with the extension of the electronic apparatus and thus the motor may be damaged.

Accordingly, a technology for controlling a size of a display more easily in consideration of a situation in which the size of the display is changed is required.

SUMMARY

An aspect provides an electronic apparatus and a method for controlling the same, the apparatus takes into account a state of a user based on an input sensed by a sensor in relation to a size control of a display, thereby changing a size of the display more conveniently and more effectively.

Another aspect provides a user interface (UI)/user experience (UX) for sensing a usage state of a user to prevent damage to a display by physical manipulation of a user upon a size change of the display, and for conveniently controlling a size of the display in a way to use to correspond to the sensed usage state.

Objects of the present invention should not be limited to the aforementioned objects and other unmentioned objects will be clearly understood by those skilled in the art from the following description.

According to an aspect, there is provided an electronic apparatus, including: a flexible display having at least a portion thereof positioned at a first surface of the electronic apparatus and changing in size to be exposed according to driving of a motor, a first sensor configured to sense a pressure applied to at least one of the first surface and a second surface opposing the first surface, and a controller configured to sense a first input to at least one of the first surface and the second surface, and, when a pressure corresponding to the first input satisfies a predetermined condition, control, based on the first input, a size of the display to be exposed at the first surface.

According to another aspect, there is also provided a method for controlling an electronic apparatus. The apparatus includes a flexible display having at least a portion thereof positioned at a first surface of the electronic apparatus and changing in size to be exposed according to driving of a motor, and a first sensor configured to sense a pressure applied to at least one of the first surface and a second surface opposing the first surface. The method includes sensing a first input to at least one of the first surface and the second surface, and, when a pressure corresponding to the first input satisfies a predetermined condition, controlling, based on the first input, a size of the display to be exposed at the first surface.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
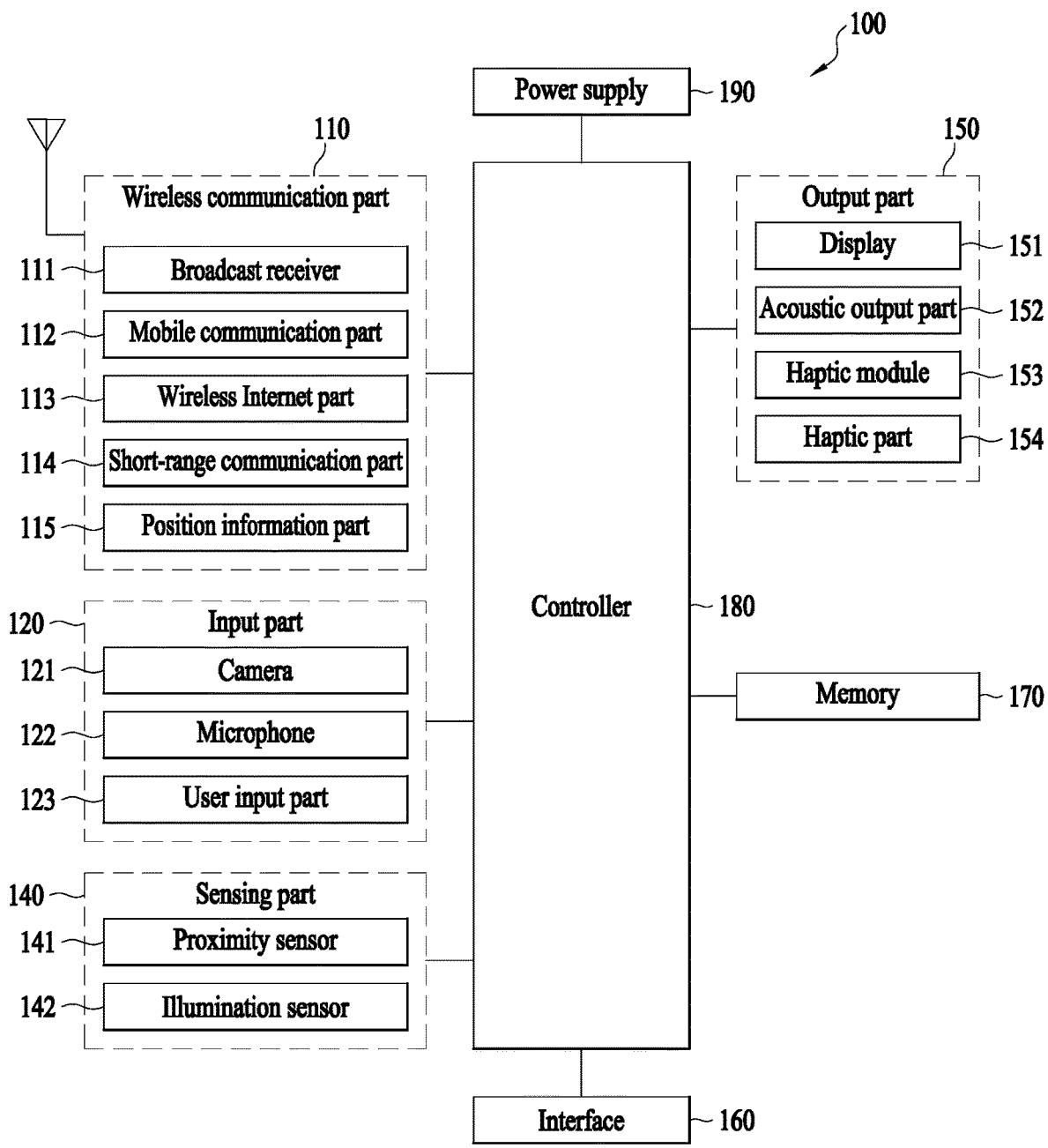
FIG. 1 is a block diagram illustrating an electronic apparatus related to an example embodiment of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present disclosure.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. On the contrary, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an electronic apparatus (or a mobile terminal) 100 related to an example embodiment of the present disclosure.

An electronic apparatus 100 may include a wireless communication part 110, an input part 120, a sensing part 140, an outer part 150, an interface 160, a memory 170, a controller (or processor) 180, and a power supply 190. The components illustrated in FIG. 1 are not essential to implementing the electronic apparatus, so the electronic apparatus 100 described herein may have more or fewer components than those listed above.

Specifically, the wireless communication part 110 may include at least one module that enables wireless communication to be performed between the electronic apparatus 100 and a wireless communication system, between the electronic apparatus 100 and another electronic apparatus 100, or between the electronic apparatus 100 and an external server. The wireless communication part 110 may include one or more modules that connect the electronic apparatus 100 to one or more networks.

The wireless communication part 110 may include at least one of a broadcast receiver 111, a mobile communication part 112, a wireless Internet part 113, a short-range communication part 114, and a position information part 115.

Referring to the wireless communication part 110, the broadcast receiver 111 of the wireless communication part 110 may receive a broadcast signal and/or broadcast related information from an external broadcast management server through a broadcast channel. The broadcast channel may include a satellite channel and a terrestrial channel. Two or more broadcast receivers may be provided to the mobile terminal 100 for simultaneous broadcast reception or broadcast channel switching for at least two broadcast channels.

The mobile communication part 112 may transmit and receive a wireless signal to and from at least one of a base station, an external terminal, and a server on a mobile communication network constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example.

The wireless signal may include various types of data based on transmission and reception of a voice call signal, a video call signal, or a text/multimedia message.

The wireless Internet part 113 may refer to a module for wireless Internet access, and may be embedded or disposed external to the electronic apparatus 100. The wireless Internet part 113 may be adapted to transmit or receive the wireless signal in the communication network based on wireless Internet technologies.

The wireless Internet technologies may be, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet part 113 may transmit and receive data based on at least one wireless Internet technology in a range including Internet technologies not listed above.

In view of that the wireless Internet access made by WiBro, HSDPA, HSUPA, GSM, CDMA, WCDMA, LTE, and LTE-A is based on a mobile communication network, the wireless Internet part 113 that performs the wireless Internet access through the mobile communication network may be understood as a kind of the mobile communication part 112.

The short-range communication part 114 may be for short-range communication, and may support the short-range communication using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, Wireless Universal Serial Bus (USB) technology. The short-range communication part 114 may use wireless area networks to support wireless communication between the electronic apparatus 100 and a wireless communication system, wireless communication between the electronic apparatus 100 and another electronic apparatus 100, or wireless communication between the electronic apparatus 100 and a network in which another mobile terminal (100 or external server). The wireless range networks may be wireless personal area networks.

The position information part 115 may be a module that acquires a position (or current position) of a mobile terminal. A representative example of the position information part 115 may be a global positioning system (GPS) mobile or a Wi-Fi module. The mobile terminal may use the GPS module to acquire a position of the mobile terminal using signals transmitted from a GPS satellite. The mobile terminal may use the Wi-Fi module to acquire a position of the mobile terminal based on information on a wireless access point (AP) that transmits or receives a wireless signal to or from the Wi-Fi module. As necessary, the position information part 115 may perform a certain function of other modules of the wireless communication part 110 to acquire data on the position of the mobile terminal, additionally or in substitution. The position information part 115 may be a module used to acquire a position (or current position) of the mobile terminal and is not limited as a module that directly calculates or acquires a position of the mobile terminal.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The camera 121 may process an image frame such as a stationary image or a moving image acquired by an image sensor in a video call mode or a capturing mode. The processed image frame may be displayed on the display 151 or stored in the memory 170. For example, the electronic apparatus 100 may include a plurality of cameras 121. In this example, the cameras 121 may be arranged in a matrix structure. Through the cameras 121 arranged in the matrix structure, a plurality of pieces of image information having various angles and focal points may be input to the electronic apparatus 100. Also, the plurality of cameras 121 may be arranged in a stereo structure to acquire left and right images for implementing a stereo image.

The microphone 122 may process an external acoustic signal into electrical voice data. The processed voice data may be variously used based on a function performed (or an application program executed) in the electronic apparatus 100. In the microphone 122, various noise removal algorithms may be implemented to remove noise generated in a process of receiving external acoustic signals.

The user input part 123 may be to receive information from a user. When the information is input through the user input part 123, the controller 180 may control an operation of the electronic apparatus 100 based on the input information. The user input part 123 may include a mechanical input means (or a mechanical key, for example, a button a dome switch, a jog wheel, and a jog switch on a front, rear, or side surface of the electronic apparatus 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in a combination of, for example, graphics, texts, icons, and videos.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic apparatus 100 and a user and simultaneously, provide an output interface between the electronic apparatus 100 and the user.

The acoustic output part 152 may output audio data stored in the memory 170 or received from the wireless communication part 110 in, for example, a call signal reception, a call mode or a recording mode, a voice recognition mode, and a broadcast reception mode. The acoustic output part 152 may output an acoustic signal related to a function (for example, a call signal reception sound and a message reception sound) performed in the electronic apparatus 100. For example, the acoustic output part 152 may include at least one of a receiver, a speaker, or a buzzer.

The haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the controller 180. For example, the haptic part 153 may output a combination of different vibrations or output different vibrations in sequence.

The optical output part 154 may output a signal to announce an event occurrence using light of a light source of the electronic apparatus 100. An event occurring in the electronic apparatus 100 may be, for example, message reception, a call signal reception, missed call, alarm, schedule notification, e-mail reception, and application-based information reception.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform an appropriate control associated with the connected external device.

The memory 170 may store data supporting various functions of the electronic apparatus 100. The memory 170 may store application programs (or applications) run in the electronic apparatus 100, data for operation of the electronic apparatus 100, and instructions. At least a portion of the application programs may be downloaded from an external server through wireless communication. Also, at least a portion of the application programs may exist in the electronic apparatus 100 for a basic function (for example, call forwarding and outgoing function and message receiving and outgoing function) of the electronic apparatus 100 from the time of manufacture. The application program may be stored in the memory 170, installed in the electronic apparatus 100, and run by the controller 180 to perform an operation (or function) of the mobile terminal.

The controller 180 may generally control an overall operation of the electronic apparatus 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the electronic apparatus 100.

The power supply 190 may supply power to each component included in the electronic apparatus 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

The electronic apparatus 100 may be in a bar shape but not limited thereto. The electronic apparatus 100 may have various shapes within the scope of not contradicting features of the present disclosure.

In the present disclosure, the electronic apparatus 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic apparatus 100 may include a deformation detection means that detects a deformation of the flexible display. The deformation detection means may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection means, the controller 180 may change information displayed on the flexible display or generate a control signal for controlling functions of the electronic apparatus 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.)

Figure 2:
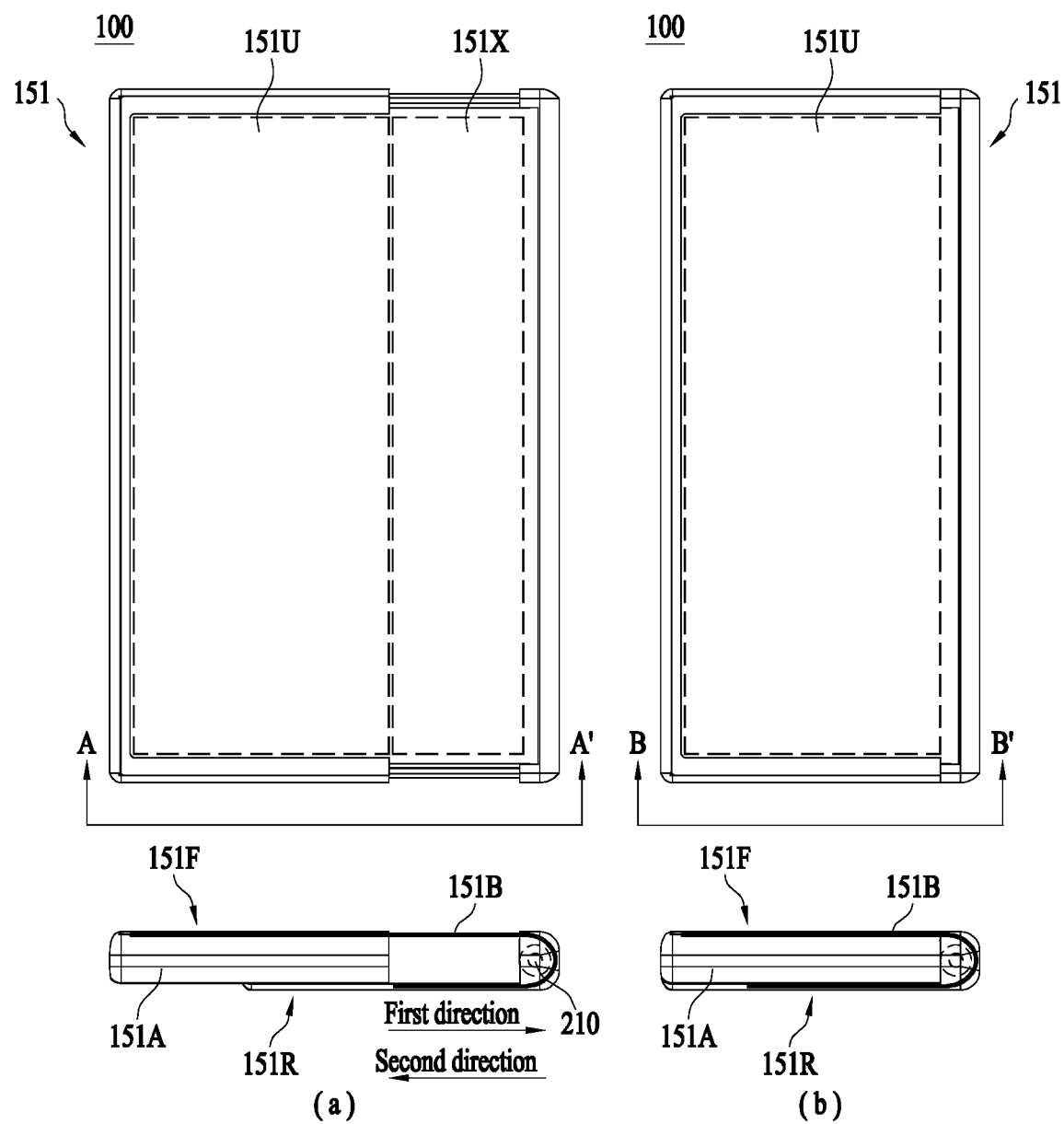
FIGS. 2 and 3 are conceptual diagrams illustrating the states before and after a display of an electronic apparatus related to an embodiment of the present disclosure is extended.
Figure 3:
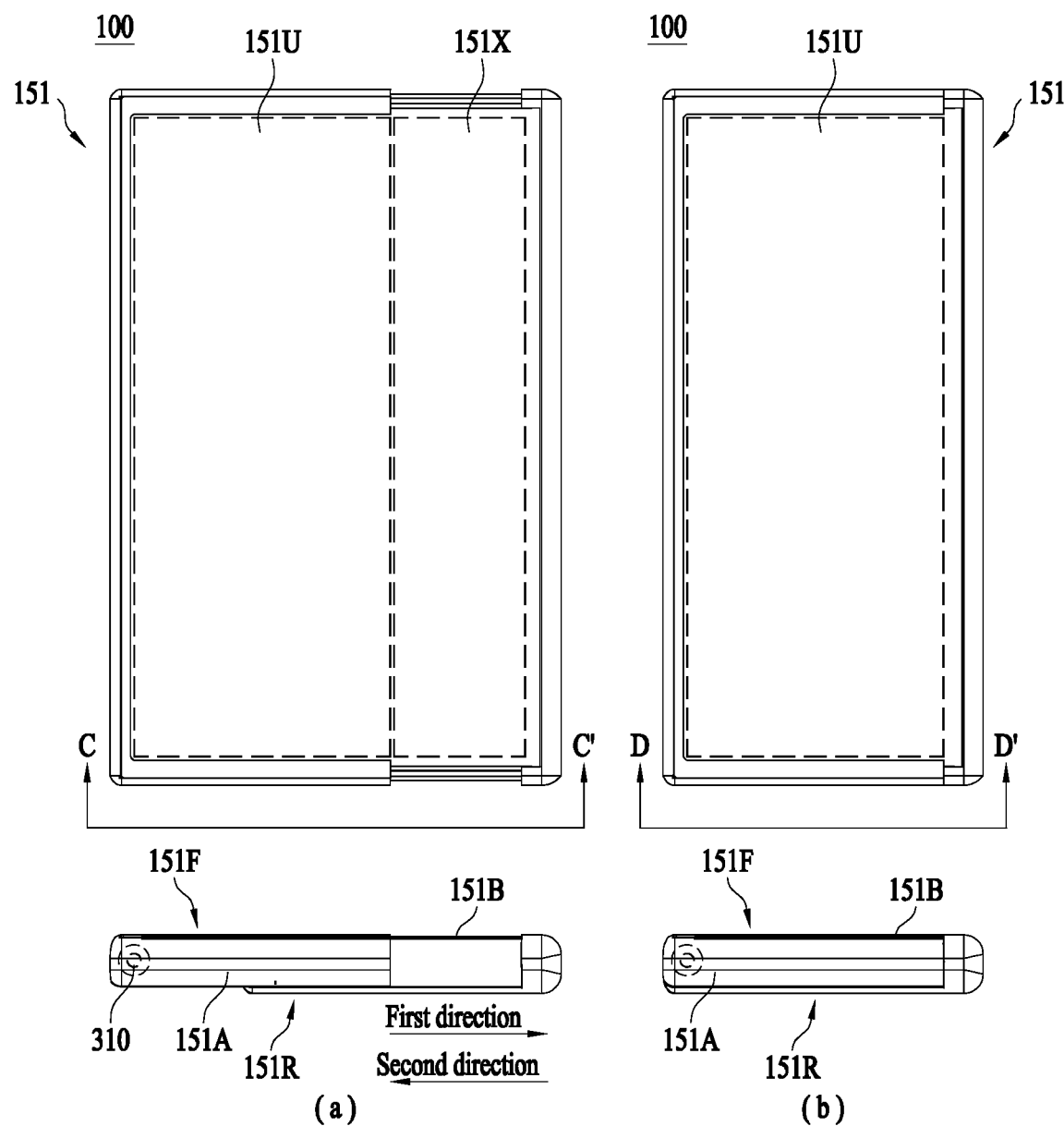

FIGS. 2 and 3 are conceptual diagrams illustrating the states before and after a display 151 of an electronic apparatus 100 related to an embodiment of the present disclosure is extended.

Specifically, FIG. 2 illustrates the case where an edge on which a display 151 is rolled up and out in relation to extension is a first direction edge 210, and FIG. 3 illustrates the case where an edge on which the display 151 is rolled up and out in relation to extension is a second direction edge 310 that opposes the first direction edge 210.

Specifically, (a) in FIG. 2 illustrates an electronic apparatus 100 with the display 151 which is extended, and (b) in FIG. 2 illustrates the electronic apparatus 100 with the display 151 which is not extended.

Referring to FIG. 2, the display 151 may have one side fixed at a front surface with reference to the electronic apparatus 100 and may be rolled up on a first direction edge 210 to be provided on a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, if the front region 151F of the display 151 increases in area, the first direction edge 210 of the display 151 may move in the first direction, and, if the front region 151F of the display 151 decreases in area, the first direction edge 210 of the display 151 may move in the second direction.

In order to guide and support the display 151 to be extended or retracted, a frame supporting the display 151 may be extended or retracted as well. The frame may include a first frame 151A and a second frame 151B, which slidably moves in the first direction relative to the first frame 151A.

A part of the front region 151F to be maintained regardless of extension and retraction of the display 151 may be defined as a fixed part 151U. A part of the front region 151F to be selectively exposed according to extension and retraction of the display 151 may be defined as a variable part 151X. In a state that the front region 151F of the display 151 is extended, the fixed part 151U of the display 151 may be positioned at the first frame 151A and the variable part 151X of the display 151 may be positioned at the second frame 151B.

When the second frame 151B slidably moves in the first direction to be extended from the first frame 151A, the front region 151F of the display 151 may be extended, causing the fixed part 151U and the variable part 151X to be exposed at the front surface. When the second frame 151B slidably moves in a direction opposite to the first direction to be retracted toward the first frame 151A, the front region 151F of the display 151 may be reduced as well, causing only the fixed part 151U to remain exposed at the front surface.

The rear region of the display 151 may be exposed at a rear surface of the second frame 151B. The rear region of the display 151 may be covered by a light-transmitting rear window and therefore visible from the outside.

Meanwhile, the front region 151F of the display 151 may be exposed at a front surface without an additional window. In some cases, however, a deco frame may cover a boundary region between the front region 151F and the first frame 151A, thereby preventing an external material and covering a bezel region of the electronic apparatus to help visibility of a screen for a user.

An electronic part may be formed in an inner surface formed by external structures such as the first frame 151A and the second frame 151B. An electronic component for driving the electronic apparatus 100, such as a battery 191, may be mounted at a main Printed Circuit Board (PCB) and thus provided in the electronic part. Alternatively, an electronic component such as an internal antenna module may be mounted directly at the electronic part rather than mounted at the main PCB.

In an embodiment, the electronic apparatus 100 may include a driving part for controlling a size of the display 151. The driving part may be implemented, for example, using a motor. The electronic apparatus 100 may control a size of the display 151 by controlling a moving direction of the first direction edge 210 of the display 151 using a motor.

Specifically, FIG. 3A illustrates an electronic apparatus 100 with a display 151 which is extended, and FIG. 3B illustrates the electronic apparatus 100 with the display 151 which is not extended.

Referring to FIG. 3, the display 151 may have one side fixed at a front region with reference to the electronic apparatus 100 and may be rolled up on a second direction edge 310 to be provided over a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, even when the front region 151F of the display 151 increases or decreases in area, the second direction edge 310 of the display 151 may remain at the same position. A redundant description of FIG. 3 with FIG. 2 will be omitted.

In FIGS. 2 and 3, the display is described as being extended in the first direction, but not limited thereto. For example, the display may be extended in the second direction. In the following description, the display may be extended in various directions (e.g., the first direction or the second direction).

Figure 4:
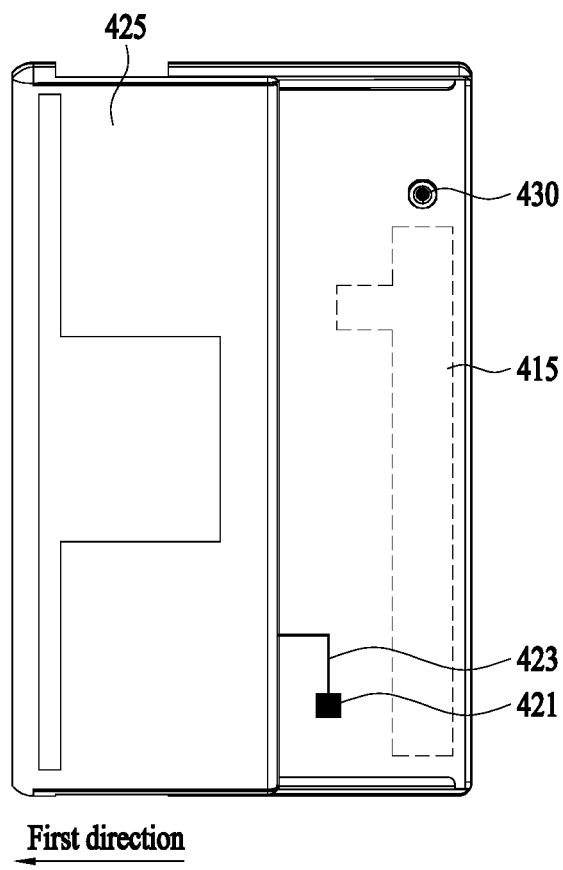
FIG. 4 is a conceptual diagram of an electronic apparatus according to an embodiment of the present disclosure.

FIG. 4 is a conceptual diagram of an electronic apparatus according to an embodiment of the present disclosure. Specifically, FIG. 4 illustrates a back surface (or rear surface) of an electronic apparatus 400 and at least some of elements included in the electronic apparatus 400.

Referring to FIG. 4, the electronic apparatus 400 may include a fixed part and a variable part. The fixed part may include a part that is maintained or fixed in position, regardless of a size change of a display. Specifically, the fixed part may include at least one of a first sensor 415, a camera 430, a base part (e.g., a substrate), or a sensing part 421 of a second sensor.

The first sensor 415 may include a sensor for sensing a pressure applied to the electronic apparatus 400, for example, a force sensor (e.g., a pressure sensor). The first sensor 415 may be disposed at a specific position in the base part of the fixed part and configured to sense a pressure applied at the specific position. As illustrated, since the first sensor 415 is disposed at the fixed position in a rear surface of the electronic apparatus 400, it is possible to easily sense a pressure applied to the rear surface of the electronic apparatus 400.

The first sensor 415 may include various types of force sensor. For example, the first sensor 415 may include at least one of a strain gauge force sensor, an inductive force sensor, a micro electro mechanical systems (MEMS) ultrasonic force sensor, or a piezo ultrasonic force sensor. Examples of arrangement of a force sensor may refer to FIGS. 9 and 10. Embodiments of the electronic apparatus 400 regarding a force sensor may refer to FIGS. 11 to 14.

The variable part may include a component of the electronic apparatus 400 moving to correspond to a size change of a display. Specifically, the variable part may include at least one of the display, which changes in position to correspond to a size change, or an electrode part 425 of the second sensor.

The display may be disposed at the base part and may be rolled up on one surface of the electronic apparatus 400 to be provided even in a front surface of the electronic apparatus. Regarding this, a detailed description is provided above with reference to FIGS. 2 and 3 and thus it will be herein omitted.

The second sensor may include a metal electrode part 425 and a sensing part 421 for detecting a change in capacitance of the electrode part 425. The second sensor may include a sensor for sensing an approach of an object based on a change in capacitance, for example, a specific absorption rate (SAR) sensor. Specifically, the sensing part 421 may correspond to the SAR sensor, for example. In addition, in an embodiment, the electrode part 425 may fix at least a portion of the display, so that the display exposed at one surface may be supported by the electrode part 425.

The sensing part 421 and the electrode part 425 of the second sensor may be connected to each other through a connector 423. For example, the sensing part 421 and the electrode part 425 may be connected to each other using at least one of a flexible programmable circuit board (FPCB), a radio frequency (RF) cable, or a metal frame. A more specific example regarding the foregoing description may refer to FIGS. 15 to 20. In an embodiment, the metal frame may be formed of a metal substance, but not limited thereto. For example, the metal frame may be formed of at least one of organic synthetic resin or carbon fiber.

The sensing part 421 may be fixed to at least a portion of the base part, and the electrode part 425 may move to correspond to a size change of the display. For example, when the size of the display is extended in the first direction, the electrode part 425 may move in the first direction in response to the extension of the display and the size of the display to be exposed at a specific surface may be controlled in response to the movement of the electrode part 425.

The connector 423 may be fixed to the base part, but not limited thereto. In some implementations, at least a portion of the connector 423 may move to correspond to the size change of the display. A more specific example regarding the foregoing description may refer to FIGS. 15 to 20.

Figure 5:
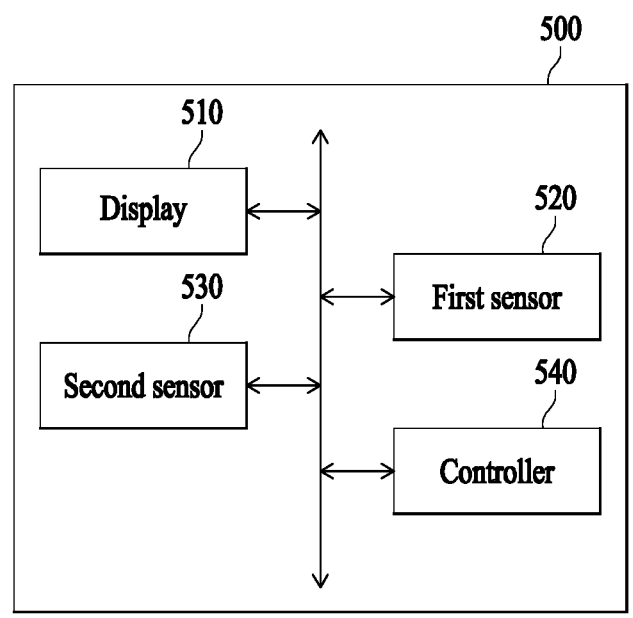
FIG. 5 is a block diagram of an electronic apparatus according to an embodiment of the present disclosure.

FIG. 5 is a block diagram of an electronic apparatus according to an embodiment of the present disclosure.

Referring to FIG. 5, an electronic apparatus 500 may include a display 510, a first sensor 520, a second sensor 530, and a controller 540. Each element of the electronic apparatus 500 may be a unit of performing at least one function or operation and may be implemented by hardware, software, or a combination of hardware and software.

The display 510 may be disposed so that a size of the display 510 to be exposed at a first surface of the electronic apparatus 500 (e.g., a front surface of the electronic apparats 500) is capable of being controlled. The display 510 may be implemented to be flexible.

The display 510 may display various types of information regarding an operation of the electronic apparatus 500. The various types of information may include a content associated with an application executed in the electronic apparatus 500.

In an embodiment, one part of the display 510 may be disposed at the first surface, and the other part of the display 510 may be rolled up on one surface of the electronic apparatus 500 to be disposed at a second surface of the electronic apparatus 500. Regarding this, a detailed description is provided above with reference to FIGS. 2 and 3 and thus it is herein omitted.

The first sensor 520 may include a force sensor for sensing a pressure. For example, the first sensor 520 may include at least one of a strain gauge force sensor, an inductive force sensor, an MEMS ultrasonic force sensor, or a piezo ultrasonic sensor.

The first sensor 520 may sense a pressure applied to at least one of the first surface (e.g., the front surface) of the electronic apparatus 500 and a second surface (e.g., a rear surface) opposing the first surface. For example, the first sensor 520 may be disposed at a fixed part of the second surface of the electronic apparatus 500 and capable of sensing a pressure applied to the second surface.

In an embodiment, the first sensor 520 may sense at least one of a magnitude of a pressure or a position at which the pressure is applied. For example, since the first sensor 520 includes at least one of a strain gauge force sensor, an inductive force sensor, an MEMS ultrasonic force sensor, or a piezo ultrasonic sensor, it is possible to sense a pressure applied to the first sensor 520. In another example, since the first sensor 520 include a piezo ultrasonic force sensor, it is possible to sense a magnitude of a pressure applied to the first sensor 520 and a position at which the pressure is applied.

The first sensor 520 may be disposed to be adjacent to the second surface rather than the first surface. In an embodiment, the first sensor 520 may be disposed in at least a portion of the first and second surfaces of the electronic apparatus 500. For example, when the display at the first surface is extended in a first direction, the first sensor 520 may be positioned adjacent to one side surface of the electronic apparatus 500 opposite to the first direction. More specifically, for example, the first sensor 520 may be disposed to be adjacent to the second surface (e.g., the rear surface) of the electronic apparatus 500, as shown in FIG. 4, and may be disposed to contact the second surface.

In an embodiment, the first sensor 520 may include a sensor having a coil patterned in at least a portion of a flexible printed circuit board (FPCB). In this case, a shape of the FPCB and a patterned shape of the coil may be predetermined. In some cases, the coil may be patterned in a plurality of portions spaced apart from each other at a predetermined interval.

In an embodiment, the first sensor 520 may include a plurality of different types of force sensor. For example, the first sensor 520 may include a force sensor which is a combination of a strain gauge type and a piezo type.

The second sensor 530 may sense an approach of an object, and the object may include a biological object. Specifically, in an embodiment, the second sensor 530 may sense an approach of an object based on a change in capacitance or based on a specific absorption rate (SAR). More specifically, the second sensor 530 may include a metal electrode part and a sensing part for sensing a change in capacitance of the electrode part. The electrode part may have a size equal to or greater than a predetermined area so as to occupy a predetermined percentage of one surface of the electrode apparatus 500.

Since the electrode part has a size equal to or greater than the predetermined area, the second sensor 530 may sense an approach of an object more sensitively.

In an embodiment, the electrode part may be disposed at a variable part of the electrode apparatus 500. For example, the electrode part may fully cover an extended surface of the electronic apparatus 500 and may move in response to extension of the display 510.

The sensing part may include an SAR sensor for sensing an approach of an object. The sensing part may be connected to the electrode part through a connector. Based on the connection, the sensing part may sense an object located within a predetermined distance from the electrode part. The connector may include, for example, at least one of an FPCB, an RF cable, or a metal cable.

For example, when the electrode part is disposed at an extended surface of the electronic apparatus 500, the sensing part may sense a user's hand holding the extended surface of the electronic apparatus 500 based on a change in capacitance of the electrode part. An object sensing method of the second sensor can be easily arrived at by those skilled in the art and thus a detailed description thereof will be herein omitted.

In an embodiment, at least a portion of the second sensor 530 may be brought into contact with a metal frame formed at an outer circumference of the electronic apparatus 500. The electrode part of the second sensor 530 may include a first clip to be brought into contact with the metal frame in response to moving of the electrode part, and a second clip to allow electrical connection between the metal frame and the sensing part. A specific example of the foregoing description may refer to FIGS. 18 to 20.

The controller 540 may include at least one processor. The controller 540 may control overall operations of the electronic apparatus 500 based on electrical or physical connection with elements of the electronic apparatus 500.

The controller 540 may sense a first input to at least one of the first surface (e.g., the front surface) and the second surface (e.g., the rear surface) of the electronic apparatus 500. For example, the controller 540 may use the first sensor 520 to sense at least one of a magnitude of a pressure applied by the first input to the electronic apparatus 500 or a position at which the pressure is applied by the first input.

Here, the first input may be a touch input applied by a user's hand holding the electronic apparatus 500. For example, the first input may include an input that is based on the user's force holding the electronic apparatus 500 in a state in which a thumb of the user is positioned at a portion of the first surface and other fingers are positioned at a portion of the second surface. The portion of the first surface corresponding to the thumb and the portion of the second surface corresponding to the other fingers may oppose each other. In addition, the portion of the second surface corresponding to the other fingers may be positioned at a fixed part including the first sensor 520.

When a pressure corresponding to the first input satisfies a predetermined condition, the controller 540 may control, based on the first input, a size of the display to be exposed at the front surface. In an embodiment, it is possible to control the size of the display based on the pressure corresponding to the first input. In another embodiment, when the pressure corresponding to the first input satisfies the predetermined condition, it is possible to control the size of the display based on an additionally received input.

In an embodiment, when a pressure depending on the first input is equal to or greater than a predetermined value, the controller 540 may control, based on the first input, the size of the display to be exposed at the first surface. For example, when a pressure applied by the first input to the first sensor 520 is equal to or greater than the predetermined value, the controller 540 may extend the size of the display. The controller 540 may extend the display to a predetermined size or may extend the display based on applying another input. A specific example regarding another input may refer to FIGS. 20 and 21.

In an embodiment, when a pressure depending on the first input smaller than the predetermined value, the controller 540 may provide information regarding the first input. For example, when the pressure applied by the first input to the first sensor 520 is smaller than the predetermined value, the controller 540 may provide information for requesting change of the first input. The information for requesting change of the first input may include, for example, a text "Please hold this electronic apparatus more tightly."

In an embodiment, the controller 540 may identify an area corresponding to the first input. Based on the identified area of the first input, the controller 540 may provide information regarding a user's pose. For example, when the area corresponding to the first input is equal to or greater than a first value, the controller 540 may determine that the user's pose holding the electronic apparatus 500 does not satisfy a predetermined condition and accordingly the controller 540 may provide information for requesting change of a pose of the user. The information for requesting change of a pose of the user may include, for example, a text "Please hold the left part of the electronic apparatus."

In an embodiment, when a second input associated with the first input is applied to a predetermined region of the second surface, the controller 540 may provide information regarding the second input. The predetermined region may include at least a portion of a part that moves in accordance with a control of size of the display 510 positioned at the first surface.

For example, when the second input is applied to at least a portion of a region of the display 510 positioned at the second surface, the controller 540 may provide information for requesting change of a pose of a user in relation to the electronic apparatus 500. Here, the second input may be an input applied due to the first input and may include an input being connected to the first input. That is, the first input and the second input may be, for example, inputs applied at different positions by fingers of the user.

The information for requesting change of a pose of the user may include, for example, a text "Please hold a more left part" or "Please move your hand to be placed only at the fixed part." In addition, a user interface (UI) for suggesting a position of the hand may be included in the information. A more specific example of the foregoing description may refer to FIGS. 11 and 12.

In some cases, the second input may include an input independent of the first input and applied to the display positioned at the second surface. In this case, the controller 540 may provide information for requesting pose change of the user. In this case, the information for requesting pose change of the user may include, for example, a text "It is held upside down." A more specific example of the foregoing description may refer to FIGS. 13 and 14.

When a value sensed by the second sensor 530 satisfies a first condition, the controller 540 may control, based on the first input, a size of the display 510 to be exposed at the first surface. The first condition may include, for example, a condition that capacitance is equal to or smaller than a predetermined value. In this case, when a value sensed by the second sensor 530 is equal to or smaller than a first value, the controller 540 may perform a control to extend the size of the display 510.

In an embodiment, when the second input is sensed by the second sensor 530, the controller 540 may control, based on the second input, a size of the display 510 to be exposed at the first surface. For example, when an input of touching the second sensor 530 is sensed, the controller 540 may reduce the size of the first display 510 to be exposed at the first surface.

The controller 540 may sense a touch input based on a change in capacitance. More specifically, when capacitance associated with the second sensor 530 exceeds a second value, the controller 540 may identify that a touch input is sensed.

The touch input may be an input in a predetermined form and may include, for example, a long touch or a double tab. However, the touch input is not limited thereto and may be implemented as various types of input.

In an embodiment, when a pressure satisfies the first condition or when capacitance satisfies a second condition, the controller 540 may display, in response to the first input, a control user interface (UI) associated with a size control of the display to be exposed at the first surface.

In an embodiment, when a pressure applied on the basis of the first input satisfies a predetermined condition, the controller 540 may display, in response to the first input, a control UI associated with a size control of the display to be exposed at the first surface. For example, when a pressure applied by the first input to the first sensor 520 is equal to or greater than the first value, the controller 540 may display the control UI with reference to a position at which the first input is applied to the first surface.

In an embodiment, when capacitance associated with the second sensor 530 satisfies a predetermined condition, the controller 540 may display, in response to the first input, a control UI associated with a size control of the display to be exposed at the first surface. For example, when capacitance sensed by the second sensor 530 is smaller than the second value, the controller 540 may display the control UI with reference to a position at which the first input is applied to the first surface.

In an embodiment, when a pressure applied on the basis of the first input and capacitance sensed by the second sensor 530 satisfy predetermined conditions, the controller 540 may display, in response to the first input, a control UI associated with a size control of the display to be exposed at the first surface. For example, when a pressure applied by the first input to the first sensor 520 is equal to or greater than the first value and capacitance sensed by the second sensor 530 is smaller than the second value, the controller 540 may display the control UI with reference to a position at which the first input is applied to the first surface.

Figure 21:
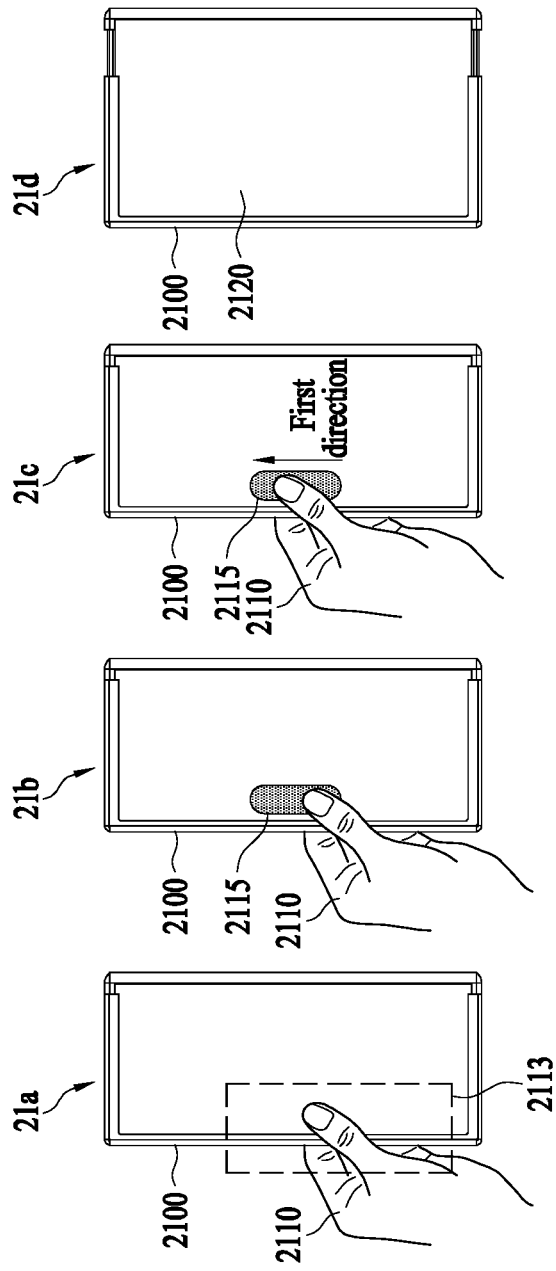
FIG. 21 is a diagram illustrating an example of a screen displayed in an electronic apparatus according to an embodiment of the present disclosure.
Figure 22:
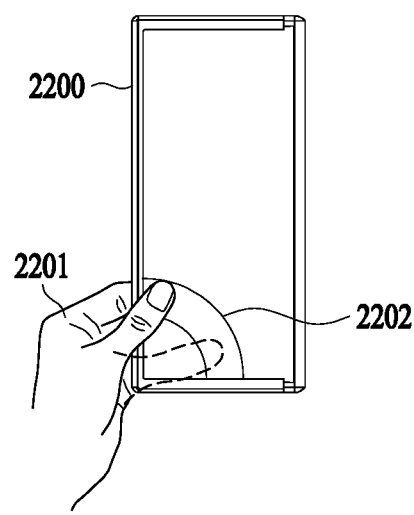
FIG. 22 is a diagram illustrating another example of a screen displayed in an electronic apparatus according to an embodiment of the present disclosure.

A more specific example regarding the control UI may refer to FIG. 21 or 22.

Figure 6:
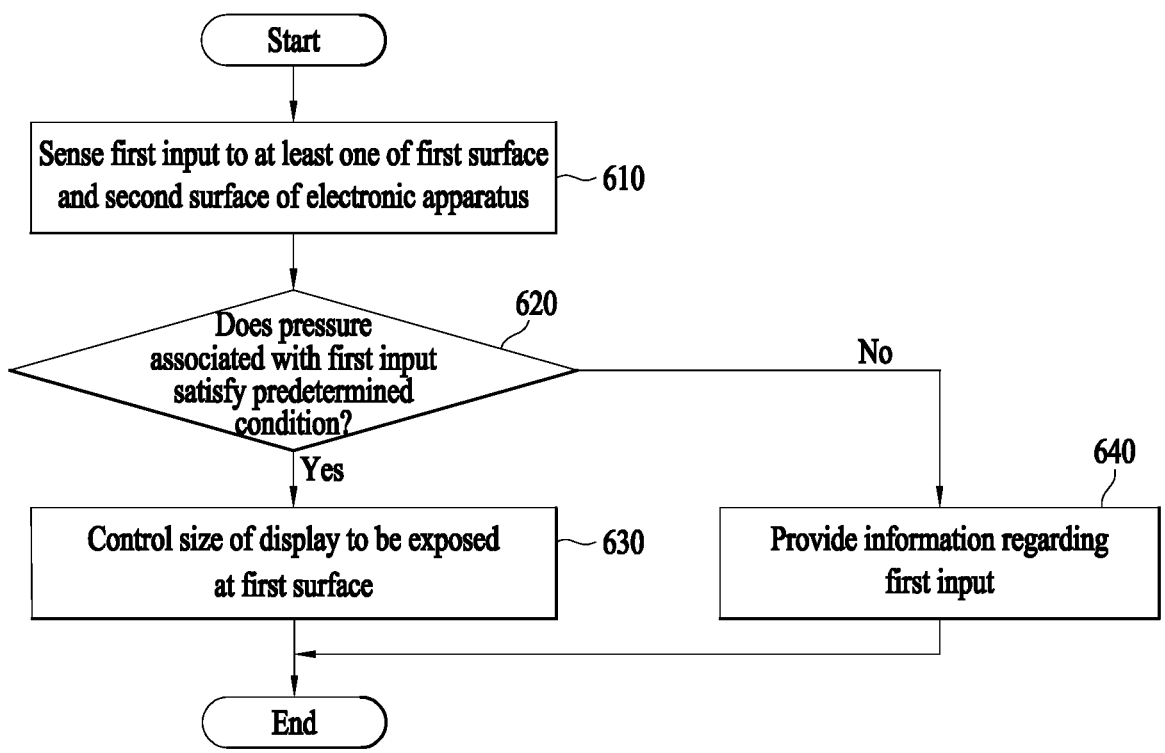
FIG. 6 is a flowchart of a method for controlling an electronic apparatus according to an embodiment of the present disclosure.

FIG. 6 is a flowchart of a method for controlling an electronic apparatus according to an embodiment of the present disclosure. It is appreciated that operations shown in FIG. 6 may be performed in a sequence different from as shown in FIG. 6.

Referring to FIG. 6, the electronic apparatus may sense a first input to at least one of a first surface (e.g., a front surface) or a second surface (e.g., a rear surface) of the electronic apparatus in operation 610. The first input may be an input applied by a user's hand holding the electronic apparatus. The first input may include, for example, a touch input applied to the first surface and the second surface. Due to the first input, a particular pressure may be applied to the electronic apparatus.

The electronic apparatus may identify whether a pressure associated with the first input satisfies a first condition in operation 620. The first condition may include a condition that a pressure applied by the first input is equal to or greater than a predetermined value. In this case, by using the first sensor for sensing a pressure applied through at least one of the first surface and the second surface opposing the first surface, the electronic apparatus may identify whether the pressure applied by the first input is equal to or greater than the predetermined value.

In an embodiment, in parallel with or irrespective of an operation of identifying a pressure, the electronic apparatus may identify an area of the first input or identify whether another input is applied in addition to the first input. Another input applied in addition to the first input may include, for example, an input applied to the display at the second surface.

When an identified pressure satisfies the first condition, the electronic apparatus may control a size of the display to be exposed at the first surface in operation 630. For example, when an identified pressure is equal to or greater than a predetermined value, the electronic apparatus may control a size of the display to be exposed at the first surface. In another example, when an identified pressure is equal to or greater than the predetermined value, the electronic apparatus may extend a size of the display based on change of the first input or based on another input associate with the first input.

When an identified pressure does not satisfy the first condition, the electronic apparatus may provide information regarding the first input in operation 640. Specifically, when an identified pressure is smaller than a predetermined value, the electronic apparatus may provide the information regarding the first input. The information regarding the first input may include information for requesting modification of the first input and may include, for example, a text "Please hold the electronic apparatus more tightly."

Either or both when an area of the first input is equal to or greater than a first value and when another input is applied in addition to the first input, the electronic apparatus may provide information regarding a pose of a user. The information regarding the pose of the user may include information for requesting pose change of the user in relation to the electronic apparatus. For example, when the area of the first input is equal to or greater than the first value, information include a text "It is held upside down" may be provided. When another input is applied in addition to the first input, information including a text "Please hold the fixed part" may be provided. Such information may be provided even when a pressure applied to the electronic apparatus is equal to or greater than a predetermined value, and, when the information is provided, operation 630 may be suspended.

Figure 7:
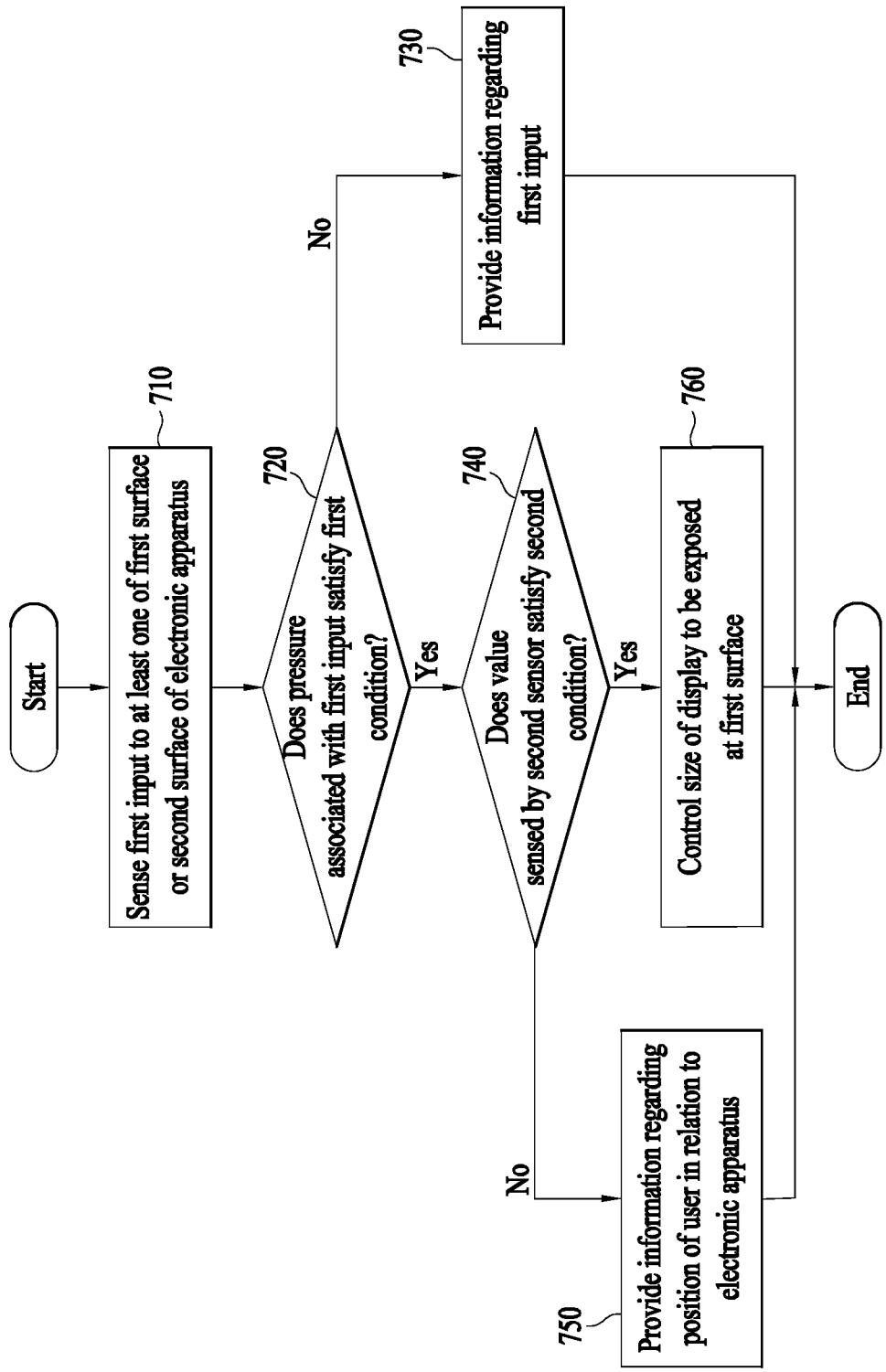
FIG. 7 is a flowchart of a method for controlling an electronic apparatus according to another embodiment of the present disclosure.

FIG. 7 is a flowchart of a method for controlling an electronic apparatus according to another embodiment of the present disclosure.

Referring to FIG. 7, the electronic apparatus may sense a first input to at least one of a first surface (e.g., a front surface) or a second surface (e.g., a rear surface) of the electronic apparatus in operation 710. The electronic apparatus may determine whether a pressure associated with the first input satisfies a first condition in operation 720. When the pressure applied to the electronic apparatus does not satisfy the first condition, the electronic apparatus may provide information regarding the first input in operation 730.

Operation 710 of FIG. 7 may correspond to operation 610 of FIG. 6. Operation 720 of FIG. 7 may correspond to operation 620 of FIG. 6. Operation 730 of FIG. 7 may correspond to operation 640 of FIG. 6. Accordingly, a detailed description will be herein omitted.

The electronic apparatus may determine whether the pressure associated with the first input satisfies the first condition, the electronic apparatus may determine whether a value sensed by the second sensor satisfies a second condition in operation 740. The second sensor may sense an approach of an object. More specifically, the second sensor may include a sensor for sensing an approach of an object based on a change in capacitance. The second condition may include a condition that capacitance sensed by the second sensor is smaller than the second value. In an embodiment, the second condition may include a condition that an approach of an object is sensed at a position corresponding to the second sensor.

When a value sensed by the second sensor does not satisfy the second condition, the electronic apparatus may provide information regarding a position of a user in relation to the electronic apparatus in operation 750. The information regarding the position of the user may include, for example, a text "Please keep hands off the extended surface."

When a value sensed by the second sensor satisfies the second condition, the electronic apparatus may control, based on the first input, a size of the display to be exposed at the first surface in operation 760. For example, when a value sensed by the second sensor satisfies the second condition, the electronic apparatus may extend the size of the display based on change of the first input or based on another input that is applied after the first input.

Figure 8:
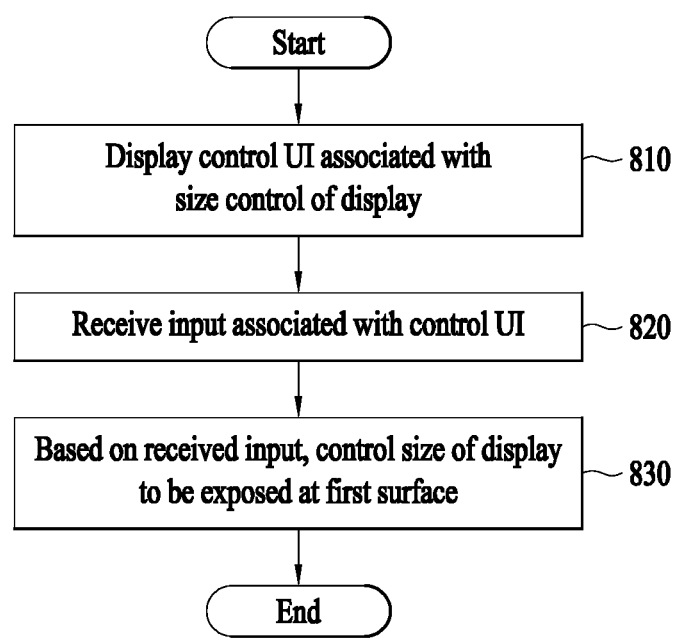
FIG. 8 is a detailed flowchart of a method for controlling an electronic apparatus according to an embodiment of the present disclosure.
Figure 9:
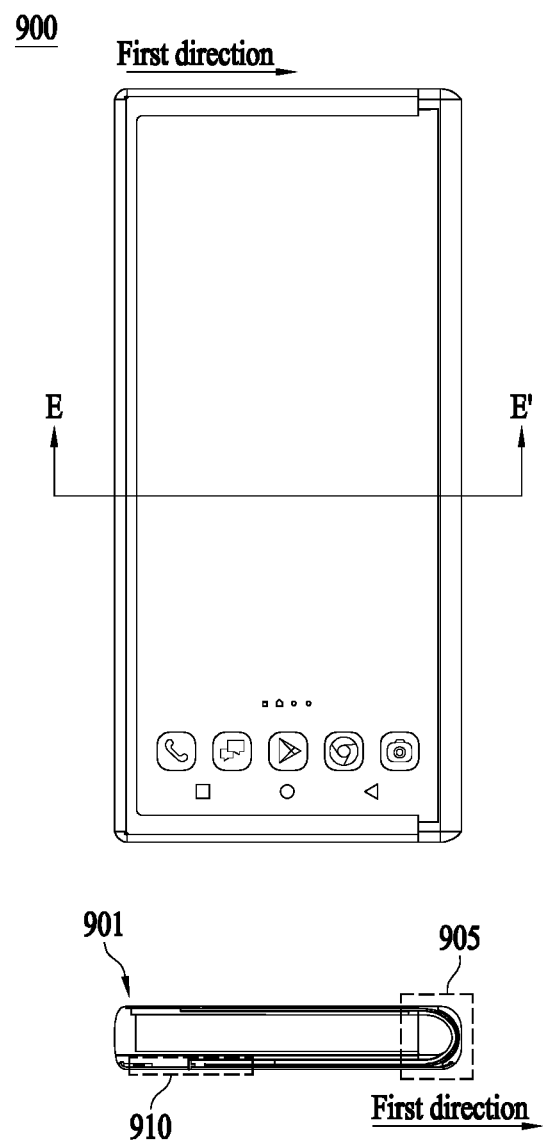
FIG. 9 is a conceptual plan view and a conceptual cross-sectional view of an electronic apparatus according to an embodiment of the present disclosure.

FIG. 8 is a detailed flowchart of a method for controlling an electronic apparatus according to an embodiment of the present disclosure. FIG. 9 shows an embodiment regarding operation 820 of FIG. 8.

Referring to FIG. 8, the electronic apparatus may display a control UI associated with a size control of a display in operation 810. The control UI may be displayed based on a first input applied to the electronic apparatus. For example, the UI may be displayed to overlap the first input or may be displayed within a predetermined distance from the first input. In another example, the control UI may be displayed at a preset position in response to the first input.

The electronic apparatus may receive an input associated with the control UI in operation 820. Specifically, the electronic apparatus may receive an input applied to the control UI. For example, the received input may include a drag input moving on the control UI, but not limited thereto.

Based on the received input, the electronic apparatus may control a size of the display to be exposed at a first surface in operation 830. In response to the received input, the electronic apparatus may extend or reduce the size of the display to a predetermined size. For example, the display may be preset to a different size according to each final position of the received input on the control UI. Based on the preset size, the electronic apparatus may control the size of the display.

A specific example regarding FIG. 8 may refer to FIG. 21 or 22.

FIG. 9 is a conceptual plan view and a conceptual cross-sectional view of an electronic apparatus according to an embodiment of the present disclosure.

Referring to FIG. 9, a cross section 901 shows a cross section of an electronic apparatus 900 taken along line E-E'. The electronic apparatus 900 may include a display capable of being extended in a first direction. The display may be rolled up on one surface 905 of the electronic apparatus 900 to be positioned from a front surface to at least a portion of a rear surface.

A first region 910 in FIG. 9 includes one region of the rear surface of the electronic apparatus 900. For example, the first region 910 may include a fixed part and a portion of a variable part at the rear surface of the electronic apparatus 900. A first sensor for sensing a pressure may be included in the fixed part of the first region 910. At least a portion of an extended display may be included in the variable part of the first region 910. A specific example regarding the first region 910 may refer to FIG. 10.

Figure 10:
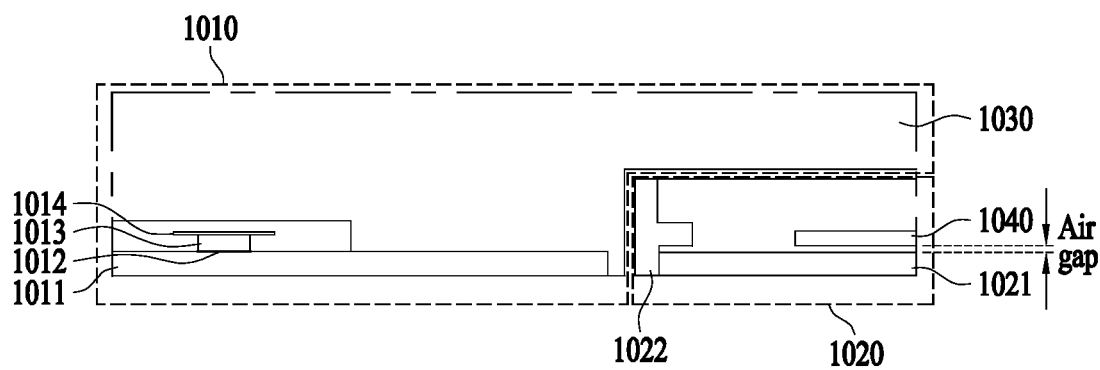
FIG. 10 is a conceptual cross sectional view of an electronic apparatus according to an embodiment of the present disclosure.

FIG. 10 is a conceptual cross sectional view of an electronic apparatus according to an embodiment of the present disclosure. Specifically, FIG. 10 is a diagram illustrating the first region 910 (hereinafter, reference numeral 910 is omitted) shown in FIG. 9 in more detail.

Referring to FIG. 10, the first region may include a fixed part 1010 and a variable part 1020. The fixed part 1010 may be a part that is maintained at a fixed position before and after the display is extended. The variable part 1020 may be a part that moves in response to extension of the display.

The fixed part 1010 may include a glass plate 1011 disposed at a rear surface of the electronic apparatus, a first sensor 1013, a FPCB 1014, and a base part 1030. The first sensor 1013 and the glass plate 1011 may be adhered to each other using epoxy 1012.

The first sensor 1013 may include a sensor for sensing a pressure applied within a predetermined distance from a portion at which the first sensor 1013 is disposed. The first sensor may include various types of sensor and may include, for example, at least one of a strain gauge force sensor, an inductive force sensor, an MEMS ultrasonic force sensor, or a piezo ultrasonic force sensor.

The variable part 1020 may include a movable plate 1022, a glass plate 1021, and one region 1040 of the display. An input to the glass plate 1021 may be transferred to the region 1040 of the display.

In an embodiment, the glass plate 1021 and the region 1040 of the display are disposed to have a predetermined gap. The glass plate 1021 may be adhered to the movable plate 1022, and the region 1040 of the display may be spaced apart from the movable plate 1022. In this case, the display and the glass plate 1021 may be driven independently in response to extension of the display, and accordingly, the display may move toward a front surface of the electronic apparatus and the glass plate 1021 may be positioned at a rear surface of the electronic apparatus.

In an embodiment, the glass plate 1011 disposed at the fixed part 1010 or the glass plate 1021 disposed at the variable part 1020 may be omitted or may be substituted with another element. This can be easily arrived at by those skilled in the art and thus a detailed description thereof will be herein omitted.

In some cases, some elements (e.g., the movable plate 1022, and the glass plate 1021) of the variable part 1020 may be designed to be fixed and thus may be excluded from the variable part 1020. Alternatively, the aforementioned elements of the electronic apparatus may be omitted or may be substituted with other elements, and such change does not limit the present disclosure.

Figure 11:
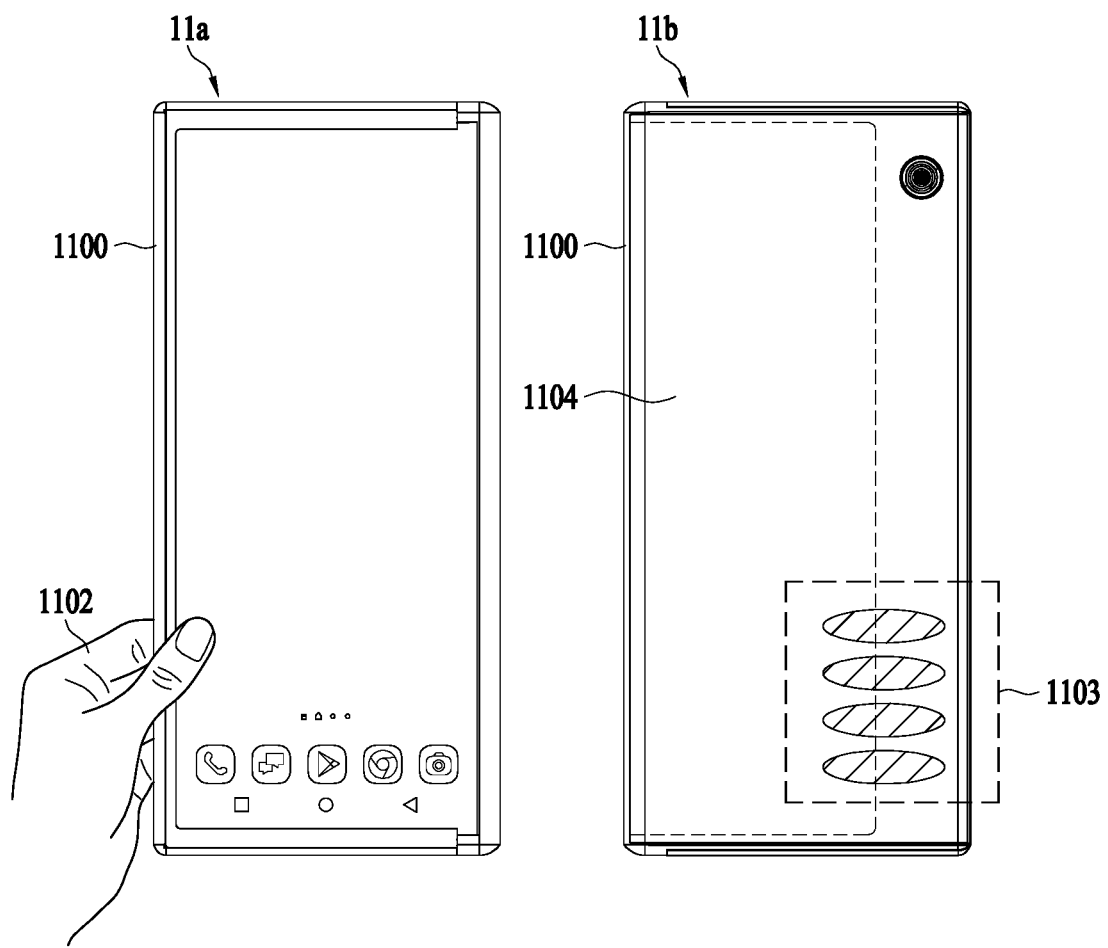
FIG. 11 shows an example in which an input is applied to an electronic apparatus according to an embodiment of the present disclosure.

FIG. 11 shows an example in which an input is applied to an electronic apparatus according to an embodiment of the present disclosure.

Referring to FIG. 11, there is illustrated information regarding a pressure applied by an input of a user of the electronic apparatus.

Reference numeral 11a shows an example of a pose of the user in relation to an electronic apparatus 1100, the example in which a user is holding one surface of the left part of the electronic apparatus 1100 with a hand 1102 (hereinafter, referred to as a grip pose). Reference numeral 11b shows an example of an input applied to a rear surface of the electronic apparatus 1100 in the grip pose in relation to the electronic apparatus 1100 as in reference numeral 11a.

According to reference numeral 11a, the thumb of the hand 1102 of the user may contact a portion of a front surface of the electronic apparatus 1100, as illustrated. According to reference numeral 11b, other four fingers of the hand 1302 of the user may contact the rear surface of the electronic apparatus 1100. Accordingly, an input 1103 may be applied to the rear surface of the electronic apparatus 1100.

In some cases, however, fingers positioned at the rear surface of the electronic apparatus 1100 may contact even a portion of a region of a display 1104 at the rear surface of the electronic apparatus 1100, as illustrated. Accordingly, the input 1103 may be applied even to at least a portion of the display 1104.

In response to a size change of the display 1104, a region in which the display 1104 is positioned may move. In this case, a frictional force or a pressure may be applied by the user's finger to a portion of a region of the display 1104, thereby causing damage to the electronic apparatus 1100. Accordingly, the electronic apparatus 1100 may provide information for guiding the input 1103 to be applied at a different region positioned independently of the display 1104 (e.g., a fixed part at which the first sensor is positioned). An example of the provided information may refer to FIG. 12.

Figure 12:
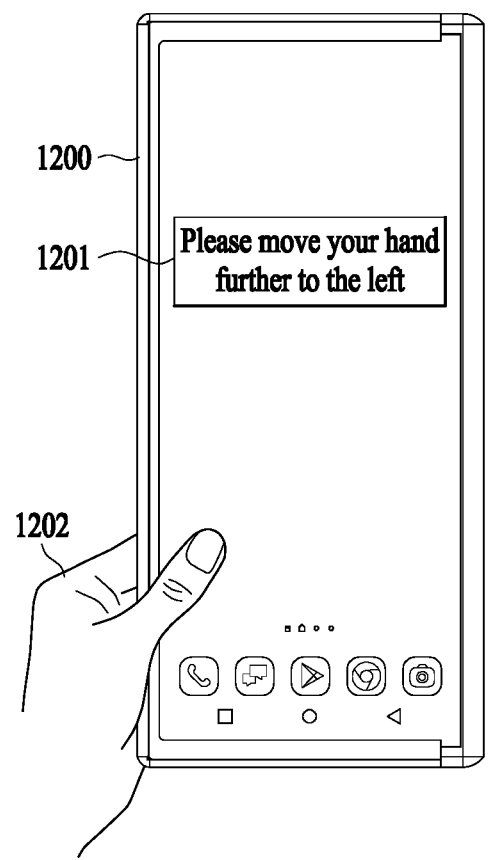
FIG. 12 is a diagram illustrating an example of a screen displayed in an electronic apparatus according to an embodiment of the present disclosure.

FIG. 12 is a diagram illustrating an example of a screen displayed in an electronic apparatus according to an embodiment of the present disclosure. Specifically, FIG. 12 illustrates an example in which information is provided based on an input applied to a display at a rear surface of the electronic apparatus, as shown in FIG. 11.

Referring to FIG. 12, when an input is applied to one region of a display at a rear surface of an electronic apparatus 1200, the electronic apparatus 1200 may provide information 1201 for guiding movement of a hand 1202 of a user.

The information 1201 may include a text "Please move your hand further to the left", but not limited thereto. As the information 1201, a different text or a different type (e.g., sound and a picture) of information may be provided.

In an embodiment, the information 1201 may be provided when an input is applied to a region of the display and at the same time a pressure equal to or greater than a predetermined value is applied. That is, the electronic apparatus 1200 may determine whether a pressure sensed due to the input applied on the basis of the hand 1202 is equal to or greater than a predetermined value and whether an input is applied even to the display at the rear surface of the electronic apparatus 1200 When the pressure sensed due to the input is equal to or greater than a predetermined value and when an input is applied to the display at the rear surface of the electronic apparatus 1200, the electronic apparatus 1200 may provide the information 1201.

In an embodiment, when an input is sensed by the first sensor, the electronic apparatus 1200 may determine whether another input is sensed in a display region located within a predetermined distance from a position at which the input is sensed by the first sensor. When another input is sensed in the display region located within the predetermined distance, the electronic apparatus 1200 may provide the information 1201.

Figure 13:
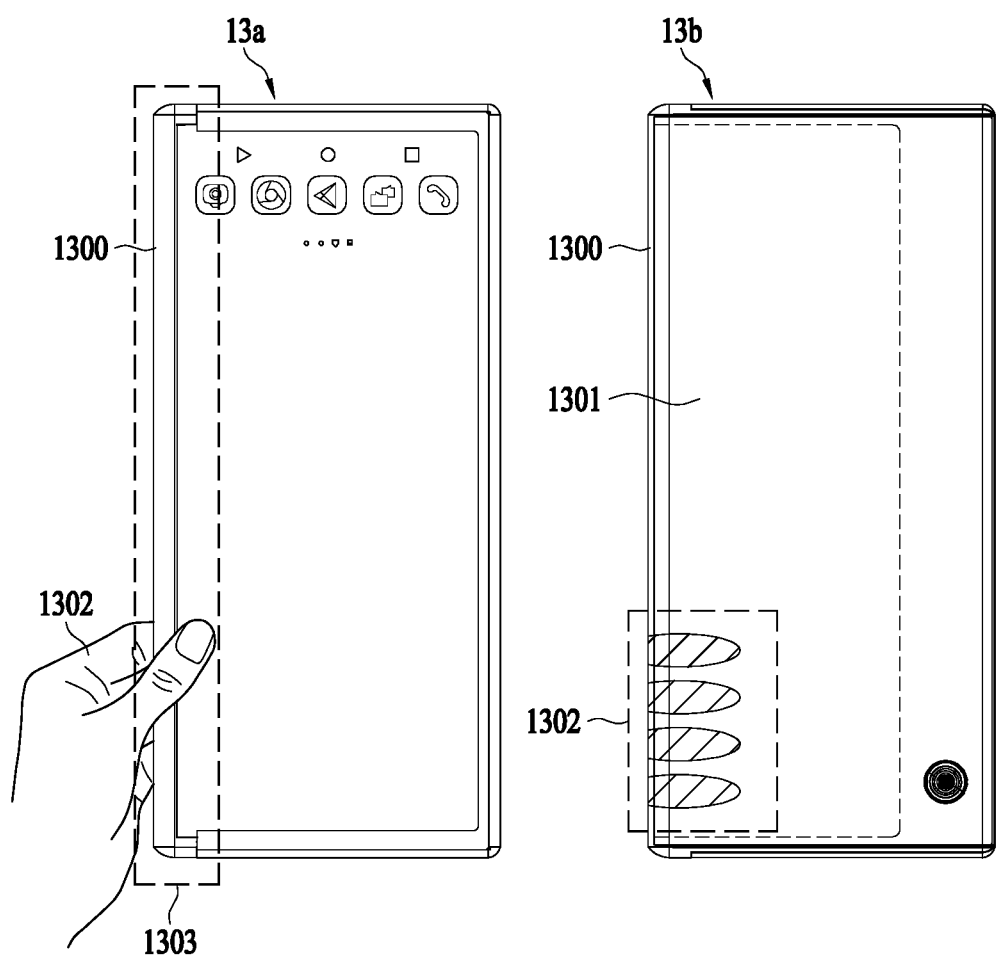
FIG. 13 is a diagram illustrating another example in which an input is applied to an electronic apparatus according to an embodiment of the present disclosure.

FIG. 13 is a diagram illustrating another example in which an input is applied to an electronic apparatus according to an embodiment of the present disclosure.

Referring to FIG. 13, there is illustrated information regarding a pressure applied by an input of a user of an electronic apparatus.

Reference numeral 13a shows an example of a pose of a user in relation to an electronic apparatus 1300, the example in which the user is holding one surface of the left part of the electronic apparatus 1300 with a hand 1302 (hereinafter, referred to as a grip pose). Reference numeral 13b shows an example of an input 1302 applied to a rear surface of the electronic apparatus 1300 in the grip pose of the electronic apparatus 1300, as indicated by reference numeral 13a.

Referring to FIG. 13A, the user may hold the electronic apparatus 1300 upside down. That is, the electronic apparatus 1300 may be positioned in a direction opposite to a direction preset for use of the electronic apparatus 1300. The thumb of the hand 1302 of the user may contact a portion of a front surface of the electronic apparatus 1300, as illustrated.

As illustrated, when the grip pose is a pose in which the hand 1302 of the user is holding the electronic apparatus 1300 in the opposite direction to the designated direction for use, a portion at which the hand 1302 of the user is positioned may correspond to a surface 1303 along which the display of the electronic apparatus 1300 is to be drawn.

In this case, as illustrated in reference numeral 13b, a part of the hand 1302 of the user may be positioned on the display at the rear surface of the electronic apparatus 1300. Accordingly, an input 1302 may be applied to a region of a display 1301.

The electronic apparatus 1300 may identify an input applied to the region of the display 1301. In an embodiment, when an input to a fixed part at which a first sensor is disposed is not identified although an input to a region of the display 1301 at the rear surface is identified, the electronic apparatus 1300 may provide information regarding a pose of the user. An example of the provided information may refer to FIG. 14.

Figure 14:
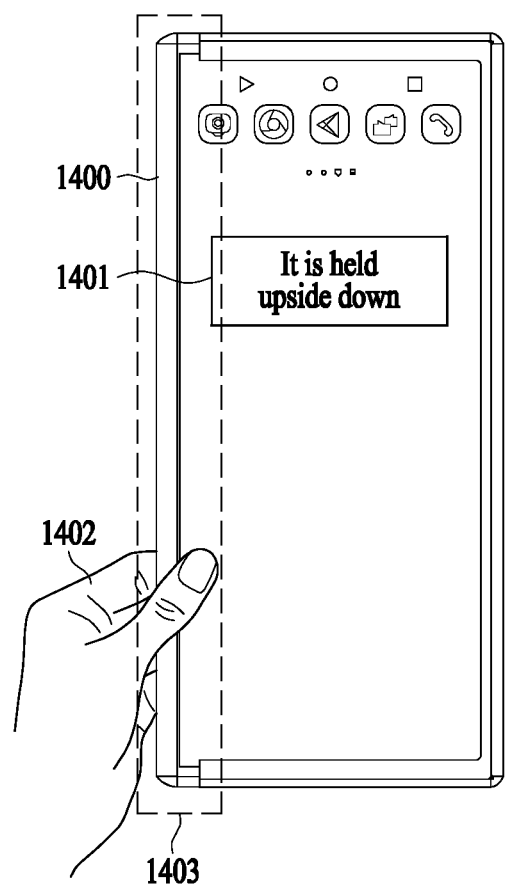
FIG. 14 is a diagram illustrating another example of a screen displayed in an electronic apparatus according to an embodiment of the present disclosure.

FIG. 14 is a diagram illustrating another example of a screen displayed in an electronic apparatus according to an embodiment of the present disclosure. Specifically, FIG. 14 illustrates an example in which information is provided in response to an input, as shown in FIG. 13, applied to a display at a rear surface of an electronic apparatus.

Referring to FIG. 14, when an input is applied to one region of a display at a rear surface of an electronic apparatus 1400, the electronic apparatus 1400 may provide information 1401 for guiding movement of a hand 1402 of a user.

The information 1401 may include a text "It is held upside down", but not limited thereto. As the information 1401, a different text or a different type (e.g., sound and a picture) of information may be provided.

In an embodiment, when an input to one region of the display is received and a pressure sensed by the first sensor is smaller than a predetermined value, the electronic apparatus 1400 may provide the information 1401.

Although not illustrated, in some implementations, a second sensor may be included in an extended surface of the display 1403. The second sensor may include a sensor for sense an approach of an object. The electronic apparatus 1400 may provide the information 1401 based on a value sensed by the first sensor and a value sensed by the second sensor.

For example, when a pressure sensed by the first sensor is smaller than a first value and capacitance sensed by the second sensor is equal to or greater than a second value, the electronic apparatus 1400 may provide the information 1401. In an embodiment, capacitance corresponding to the second value may be determined based on a degree of proximity of an object approaching to a position corresponding to the second sensor.

Figure 15:
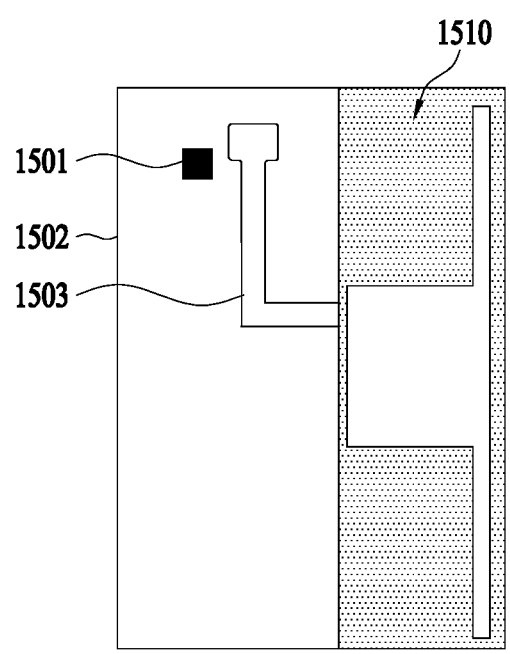
FIG. 15 is a diagram illustrating an example of a second sensor of an electronic apparatus according to an embodiment of the present disclosure.
Figure 16:
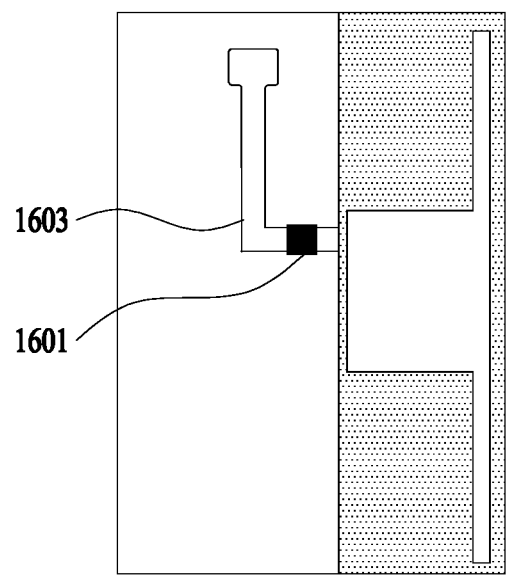
FIG. 16 is a diagram illustrating another example of a second sensor of an electronic apparatus according to an embodiment of the present disclosure.

FIGS. 15 and 16 are diagrams illustrating examples of a second sensor of an electronic apparatus according to an embodiment of the present disclosure.

Specifically, FIG. 15 illustrates some of elements in a rear surface of the electronic apparatus. Referring to FIG. 15, a base part 1502, a sensing part 1501 of the second sensor, a connector 1503 of the second sensor, and an electrode part 1510 of the second sensor may be disposed at the rear surface of the electronic apparatus.

The base part 1502 may include a basic configuration in which various components of the electronic apparatus, including illustrated elements, are arranged.

The sensing part 1501 may include a sensor (e.g., an SAR sensor) for sensing an object in proximity based on a change in capacitance. As illustrated, the sensing part 1501 may be disposed at the base part 1502 including a PCB and may be connected with the connector 1503 including an FPCB on the basis of the base part 1502. The connector 1503 may be connected with the electrode part 1510.

Accordingly, the sensing part 1501, the connector 1503, and the electrode part 1510 may be connected.

The electrode part 1510 may be formed of a metallic substance having a predetermined area or more. The predetermined area may be smaller than a size of the electronic apparatus. In some implementations, however, a length of the electrode part 1510 may correspond to a length of the electrode apparatus and may correspond to a size of a variable part of the electronic apparatus. In addition, in an embodiment, the electrode part 1510 may include at least one hole formed therein. A shape of the hole may be determined based on a relation to other components arranged in the electronic apparatus.

In an embodiment, the sensing part 1501 may detect a change in capacitance due to an object approaching to the electrode part 1510, on the basis of connection with the electrode part 1510. In this case, since the electrode part 1510 has a relatively large area, as illustrated, sensitivity of the sensing part 1501 may increase. That is, the second sensor may sense a degree of proximity of an object more precisely.

FIG. 16 illustrates an example in which a sensing part 1601 (corresponding to the sensing part 1501 of FIG. 15) is arranged in a manner different from in FIG. 15. Specifically, FIG. 16 illustrates an example in which the sensing part 1601 is arranged to overlap a connector 1603.

In this case, the sensing part 1601 may be connected directly with the connector 1603.

Since an FPCB is included, the connector 1503, 1603 of FIG. 15 or 16 may flexibly change in shape. Accordingly, the sensing part 1501, 1601 at a fixed position and the electrode part 1510 moving in response to movement of a display may be connected easily. That is, as at least a portion of the connector changes in shape or position in response to movement of the electrode part 1510, connection between the sensing part 1501, 1601 and the electrode part 1510 may be maintained more effectively.

Figure 17:
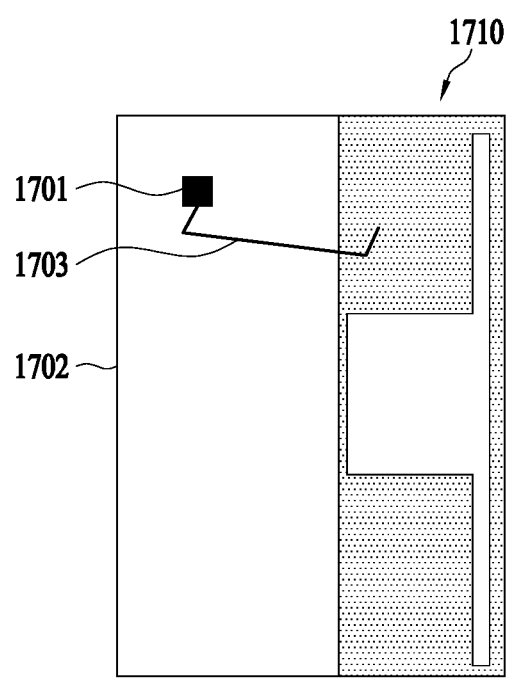
FIG. 17 is a diagram illustrating yet another example of a second sensor of an electronic apparatus according to an embodiment of the present disclosure.

FIG. 17 is a diagram illustrating another example of a second sensor of an electronic apparatus according to an embodiment of the present disclosure. Specifically, FIG. 17 illustrates an example in which a connector 1703 of a second sensor is implemented as a radio frequency (RF) cable.

Referring to FIG. 17, a sensing part 1701 may be disposed at a base part 1702. An electrode part 1710 may be spaced a predetermined distance apart from the sensing part 1701. In this case, the connector 1703 may connect the sensing part 1701 and the electrode part 1710 with each other.

Specifically, one end of the connector 1703 may be connected with the sensing part 1701 and the other end may be connected to the electrode part 1710. A position of one end of the connector 1703 connected with the sensing part 1701 may remain at a fixed position relative to a position of the sensing part 1701. The other end of the connector 1703 connected with the electrode part 1710 may move in response to movement of the electrode part 1710.

Figure 18:
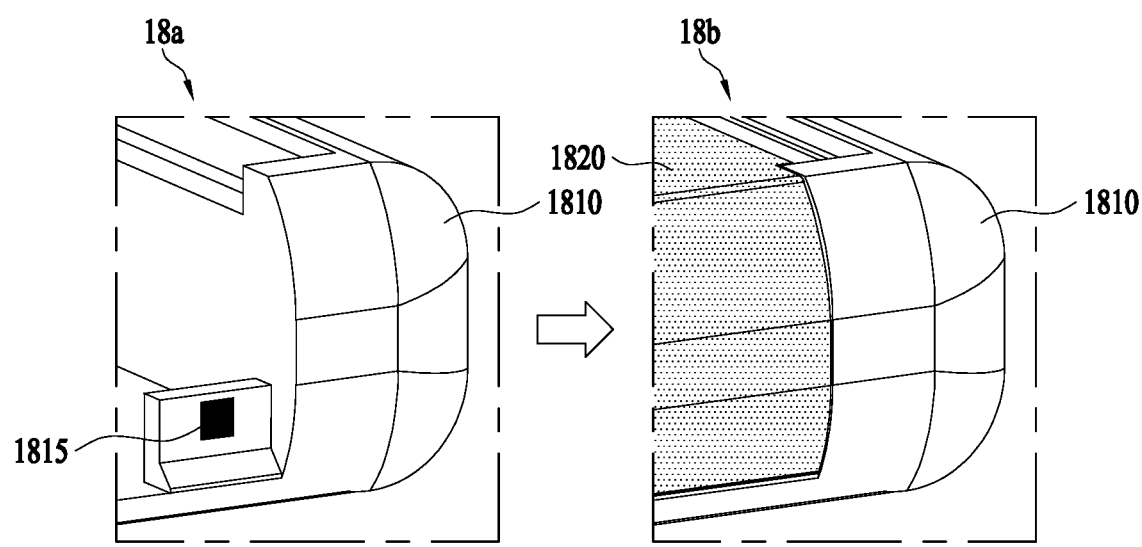
FIG. 18 is a diagram illustrating in detail an example of some elements of a second sensor of an electronic apparatus according to an embodiment of the present disclosure.
Figure 19:
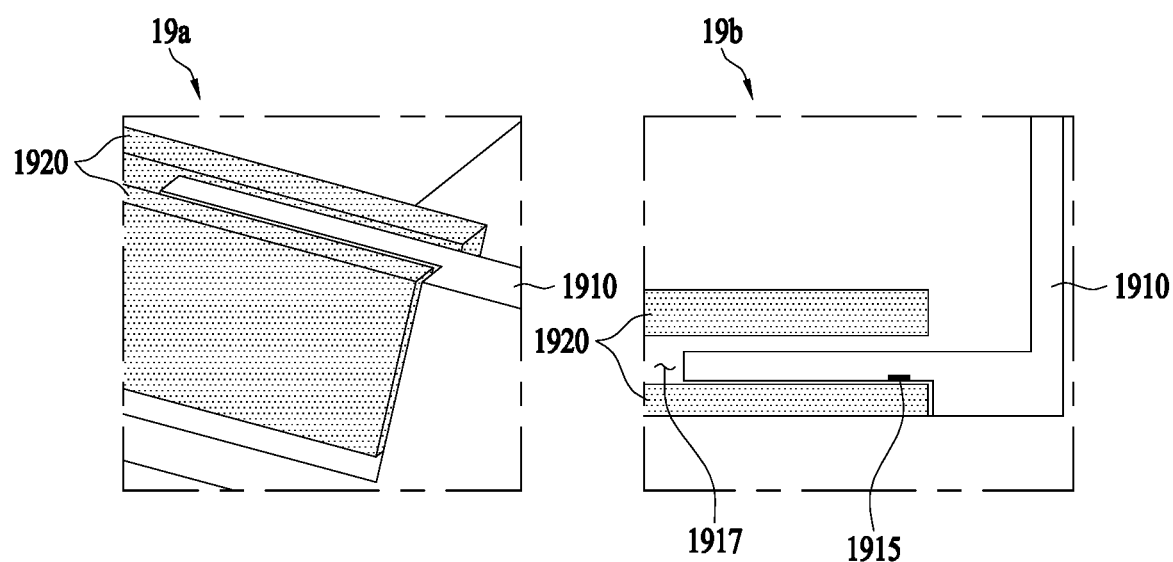
FIG. 19 is a diagram illustrating in detail another example of some elements of a second sensor of an electronic apparatus according to an embodiment of the present disclosure.
Figure 20:
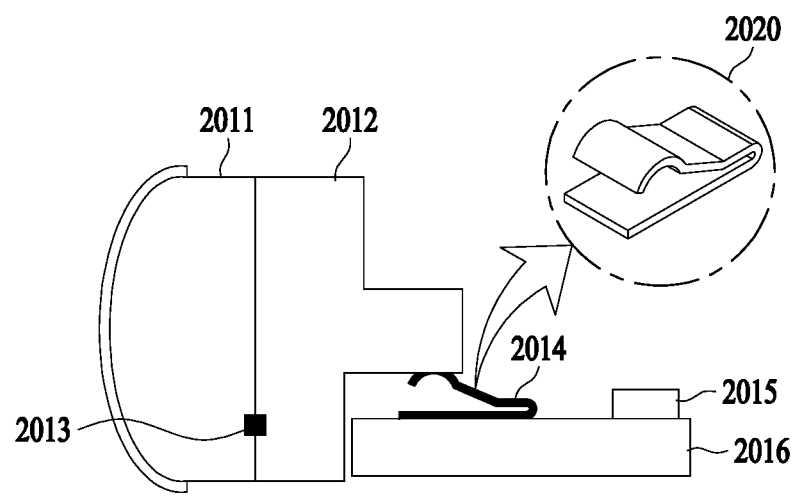
FIG. 20 is a diagram illustrating in detail yet another example of some elements of a second sensor of an electronic apparatus according to an embodiment of the present disclosure.

FIGS. 18 to 20 are diagrams illustrating an example of some elements of a second sensor of an electronic apparatus according to an embodiment of the present disclosure.

In an embodiment, a body of an electronic apparatus may include a metal frame. In an embodiment, since the body of the electrode apparatus is formed of the metal frame, a shape of the electronic apparatus may be maintained. The metal frame may include a kind of metal substance. In this case, in order for the electronic apparatus to utilize an area of an electrode part of a second sensor to the maximum, the metal frame may perform the same function as that of the electrode part. In doing so, the electrode part may extend.

Hereinafter, FIGS. 18 to 20 illustrate examples in which a metal frame is capable of performing a function as an electrode of a second sensor.

FIG. 18 conceptually illustrate examples before and after an electrode part 1810 is coupled with a metal frame 1820. Specifically, reference numeral 18*a* illustrates the electrode part 1810 and reference numeral 18*b* illustrates a state that the electrode part 1810 is coupled with the metal frame 1820.

According to reference numeral 18*a*, the electrode part 1810 may include a first clip 1815. The first clip 1815 may be positioned at (or adhered to) a portion of the electrode part 1810. The first clip 1815 may include a metal substance having a predetermined area and a predetermined width. In this case, the portion at which the first clip 1815 is positioned may protrude compared with a surrounding area of the electrode 1810.

Reference numeral 18*b* illustrates a state that a display has the smallest size exposed at a first surface, for example, a state before the display is extended. According to reference numeral 18*b*, the electrode part 1810 may be coupled with the metal frame 1820.

In an embodiment, a gap of a predetermined distance may exist between the electrode part 1810 and the metal frame 1820. However, the gap may be narrowed down using the first clip 1815. More specifically, the electrode part 1810 and the metal frame 1820 may be connected through the first clip 1815. Accordingly, it is possible to more completely achieve electrical or mechanical connection between the electrode part 1810 and the metal frame 1820.

FIG. 19 is a diagram illustrating coupling between the electrode part 1810 and the metal frame 1820 in more detail.

Reference numeral 19*a* of FIG. 19 conceptually illustrates a perspective view of a portion hidden by coupling between the electrode part 1810 and the metal frame 1820 shown in reference numeral 18*b* of FIG. 18. Reference numeral 19*b* conceptually illustrates a plan view of reference numeral 19*a*.

According to reference numeral 19*a* and reference numeral 19*b*, a metal frame 1920 and an electrode part 1910 may be detachably coupled with each other. Specifically, a first portion 1917 allowing the electrode part 1910 to be coupled therewith may be included in the metal frame 1920. As the electrode part 1910 is inserted into the first portion 1917 included in the metal frame 1920, the electrode part 1910 and the metal frame 1920 may be coupled with each other.

As illustrated in reference numeral 19*b*, a first clip 1915 may be interposed between the electrode part 1910 and the metal frame 1920 to connect the electrode part 1910 and the metal frame 1920. Alternatively, the first clip 1915 may be interposed between the electrode part 1910 and the metal frame 1920 to cause a gap between the electrode part 1910 and the metal frame 1920 to be equal to or smaller than a predetermined value.

In this case, the electrode part 1910, the metal frame 1920, and the first clip 1915 may contain a metal substance. Accordingly, the electrode part 1910, the metal frame 1920, and the first clip 1915 may be electrically connected.

FIG. 20 illustrates an example in which a metal frame 2012 serves as an electrode part 2011 or a connector.

Referring to FIG. 20, the electrode part 2011 may be connected with the metal frame 2012 through a first clip 2013 therebetween. The metal frame 2012 may contact a second clip 2014 disposed at a base part.

The second clip 2014 may contain a metal substance. One part of the second clip 2014 may be disposed at a base part 2016, and the other part of the second clip 2014 may contact the metal frame 2012.

In an embodiment, one part of the second clip 2014 may be inserted into the base part 2016 and the other part of the second clip 2014 may be disposed on the base part 2016. A portion of the second clip 2014 exposed because the second clip 2014 is disposed on the base part 2016 may refer to reference numeral 2020.

A sensing part 2015 may be positioned at the base part 2016 (e.g., a PCB). In this case, the second clip 2014 and the sensing part 2015 at the base part 2016, may be connected. Since the base part 2016 is configured as a PCB, the base part 2016 may connect various elements at the base part 2016 with one another. Such connection on the basis of the base part 2016 can be easily arrived at by those skilled in the art, and thus, a detailed description thereof is herein omitted.

As a result, the electrode part 2011, the first clip 2013, the metal frame 2012, the second clip 2014, and the sensing part 2015 may be connected with one another. Meanwhile, a specific example regarding a shape of the second clip 2014 may refer to reference numeral 2020.

In an embodiment, a fixed part may include the first clip 2013, the metal frame 2012, the second clip 2014, and the sensing part 2015, and a variable part may include the electrode part 2011. In this case, connection with the metal frame may be made before a display is extended.

FIG. 21 is a diagram illustrating an example of a screen displayed in an electronic apparatus according to an embodiment of the present disclosure.

According to reference numeral 21*a*, a first input may be applied by a user holding a portion 2113 of an electronic apparatus 2100. The first input may include a touch input to at least one of a first surface (e.g., a front surface) and a second surface (e.g., a rear surface) of the electronic apparatus 2100. In addition, the first input may provide a pressure of a predetermined value to a position at which the first input is applied.

When an input satisfies a predetermined condition, the electronic apparatus 2100 may provide a control UI (or an indicator) 2115, as indicated by reference numeral 21*b*. For example, when the input satisfies the predetermined condition, the electronic apparatus 2100 may display, through a display, the control UI 2115 at a position associated with the input.

The predetermined condition may include, for example, a condition that a sensed pressure associated with the first input, but not limited thereto. For example, the predetermined condition may include any of various conditions, such as a condition that a sensed pressure associated with the first input is equal to or greater than a predetermined value and an input is not applied to the display at the rear surface.

According to reference numeral 21c, an input of moving in a first direction in association with the control UI 2115 may be applied. The electronic apparatus 2100 may identify the input. For example, the electronic apparatus 2100 may identify a moving direction of an input or a position at which an input is applied.

Based on an input associated with the control UI 2115, the electronic apparatus 2100 may control a size of a display 2120. For example, when an input applied in relation to the control UI 2115 includes an input of dragging a predetermined distance in a first direction, the electronic apparatus 2100 may extend the display 2120 to a size preset to correspond to the predetermined distance.

FIG. 22 is a diagram illustrating another example of a screen displayed in an electronic apparatus according to an embodiment of the present disclosure. Specifically, FIG. 22 shows another example of a control UI 2202.

Referring to FIG. 22, an electronic apparatus 2200 may display a control UI 2202 in in the form of a curved content, as illustrated. In this case, an input may be applied to the control UI 2202 on the basis of a user's finger moving to the left and right relative to the user's hand while applying an input to the control UI 2202.

In an embodiment, the electronic apparatus 2200 may identify a position at which a first input is applied and satisfies a predetermined condition. The electronic apparatus 2200 may calculate a distance between the first input and a first position. With reference to a preset first position, the electronic apparatus 2200 may provide the control UI 2202 in a shape corresponding to at least a portion of a circle of which a radius corresponds to the calculated distance.

Here, the first position may include, for example, a portion adjacent to a bottom left edge of a display of the electronic apparatus 2200, but not limited thereto.

In an electronic apparatus and a method for controlling the same according to an embodiment of the present disclosure, since a size of a display is controlled based on an input sensed by a sensor (e.g., a first sensor and a second sensor), it is possible to change the size of the display more effectively in consideration of a state of a user.

Through embodiments, the electronic apparatus is described as providing text information to a user, but not limited thereto, and it is possible to provide the user with a UI alone or along with the text information, the UI suggesting the user's pose in relation to the electronic apparatus.

In an electronic apparatus and a method for controlling the same according to an embodiment of the present disclosure, since a size of a display is controlled based on an input sensed by a sensor, it is possible to change the size of the display more effectively in consideration of a state of a user.

Effects which can be obtained in the present disclosure are not limited to the aforementioned effects and other unmentioned effects will be clearly understood by those skilled in the art from the following description.

Effects are not limited to the aforementioned effects, and other effects not mentioned will be clearly understood by those skilled in the art from the description of the claims.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure).

What is claimed is:

1. An electronic apparatus, comprising:
   a flexible display including at least a portion of the flexible display positioned at a front side of the electronic apparatus, wherein a size of the portion of the flexible display positioned at the front side of the electronic apparatus is changeable;
   a fixed part having a predetermined fixed position;
   a variable part that moves for changing a size of the portion of the flexible display positioned at the front side;
   a first sensor disposed at the fixed part and configured to detect a pressure applied to rear side of the electronic apparatus;
   a second sensor comprising a metal electrode part disposed at the variable part and configured to sense an approach of an object; and
   a controller configured to detect a first input to the rear side using the first sensor and the second sensor for controlling the size of the portion of the flexible display positioned at the front side based on a pressure corresponding to the first input satisfying a predetermined condition.

2. The electronic apparatus of claim 1, wherein the size of the portion of the flexible display positioned at the front side is controlled based on the first input when the pressure corresponding to the first input is greater than or equal to a predetermined value.

3. The electronic apparatus of claim 1, wherein the controller is further configured to provide information regarding the first input when the pressure corresponding to the first input is smaller than a predetermined value.

4. The electronic apparatus of claim 1, wherein the controller is further configured to provide information regarding a detected grip pose of a user of the electronic apparatus, wherein the detected grip pose is identified based on an area of the flexible display corresponding to the detected first input.

5. The electronic apparatus of claim 1, wherein the controller is further configured to provide information regarding a second input when the second input associated with the first input is received in a specific region of the rear side, wherein the specific region comprises at least a portion of the flexible display positioned at the front side that moves according to a size control of the flexible display positioned at the front side.

6. The electronic apparatus of claim 1, wherein the controller is further configured to provide information regarding a detected grip pose of a user of the electronic apparatus when the first input comprises a second input to the flexible display at the rear side.

7. The electronic apparatus of claim 1, wherein the portion of the flexible display is disposed at the variable part.

8. The electronic apparatus of claim 1, wherein the portion of the flexible display positioned at the first side extends in a first direction, and wherein the first sensor is disposed to be adjacent to one side of the electronic apparatus in a direction opposite to the first direction.

9. The electronic apparatus of claim 1, wherein the size of the portion of the flexible display positioned at the front side is controlled based on the first input being dragged in a first direction.

10. The electronic apparatus of claim 1, wherein the first sensor comprises at least one of a strain gauge force sensor, an inductive force sensor, a micro electro mechanical system (MEMS) ultrasonic force sensor, or a piezo ultrasonic force sensor.

11. The electronic apparatus of claim 1, wherein the second sensor is configured to sense the approach of an object based on a change in capacitance or based on a specific absorption rate (SAR).

12. The electronic apparatus of claim 11, wherein the predetermined condition corresponds to the pressure detected by the first sensor corresponding to the first input being equal to or greater than a first predetermined value, and the change sensed by the second sensor corresponding to the first input being equal to or smaller than a second predetermined value.

13. An electronic apparatus comprising:
a flexible display including at least a portion of the flexible display positioned at a front side of the electronic apparatus, wherein a size of the at least a portion of the flexible display positioned at the front side of the electronic apparatus is changeable;
a first sensor configured to detect a pressure applied to a rear side of the electronic apparatus, wherein the first sensor is disposed to be adjacent to the rear side;
a controller configured to detect a first input to the rear side using the first sensor for controlling the size of the at least a portion of the flexible display positioned at the front side based on a pressure corresponding to the first input satisfying a predetermined condition;
a second sensor configured to detect an approach of an object based on a change in capacitance, wherein the second sensor comprises a metal electrode part and a sensing part configured to detect a change in capacitance of the metal electrode part, wherein the sensing part is disposed at a fixed part of the electronic apparatus and the metal electrode part is disposed at a variable part of the electronic apparatus;
the fixed part having a predetermined fixed position and the variable part that moves for changing a size of the portion of the flexible display positioned at the front side, wherein the controller is further configured to control the size of the at least a portion of the flexible display positioned at the front side based on the first input when a value detected by the second sensor satisfies a first condition.

14. The electronic apparatus of claim 13, wherein the controller is further configured to control the size of the portion of the flexible display positioned at the front side based on a second input detected by the second sensor.

15. The electronic apparatus of claim 13, wherein the metal electrode part and the sensing part are connected using at least one of a flexible programmable circuit board (FPCB), a radio frequency (RF) cable, or a metal frame, and wherein the second sensor further comprises a specific absorption rate (SAR) sensor.

16. The electronic apparatus of claim 13, wherein the metal electrode part moves corresponding to a size change of portion of the flexible display positioned at the front side, and
the electronic apparatus further comprises:
a metal frame formed at an outer surface of the electronic apparatus,
a first clip fixed to one side of the metal electrode part and configured to contact the metal frame based on movement of the metal electrode part, and
a second clip electrically connecting the metal frame and the sensing part.

17. An electronic apparatus, comprising:
a flexible display including at least a portion of the flexible display positioned at a front side of the electronic apparatus, wherein a size of the at least a portion of the flexible display positioned at the front side of the electronic apparatus is changeable;
a fixed part having a predetermined fixed position;
a variable part that moves for changing a size of the portion of the flexible display positioned at the front side;
a first sensor configured to detect a pressure applied to a rear side of the electronic apparatus;
a controller configured to detect a first input to the rear side using the first sensor for controlling the size of the portion of the flexible display positioned at the front side based on a pressure corresponding to the first input satisfying a predetermined condition,
wherein the controller is further configured to provide information regarding the first input based on an identification that a detected grip pose of a user is on the variable part.

* * * * *